(12) United States Patent
Ido et al.

(10) Patent No.: US 11,973,435 B2
(45) Date of Patent: Apr. 30, 2024

(54) POWER CONVERSION DEVICE

(71) Applicant: Mitsubishi Electric Corporation, Tokyo (JP)

(72) Inventors: Yasunori Ido, Tokyo (JP); Hideaki Ohashi, Tokyo (JP); Noriyuki Imada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 299 days.

(21) Appl. No.: 17/607,060

(22) PCT Filed: May 21, 2019

(86) PCT No.: PCT/JP2019/020106
§ 371 (c)(1),
(2) Date: Oct. 28, 2021

(87) PCT Pub. No.: WO2020/234998
PCT Pub. Date: Nov. 26, 2020

(65) Prior Publication Data
US 2022/0231614 A1    Jul. 21, 2022

(51) Int. Cl.
*H02M 7/25* (2006.01)
*H02M 1/32* (2007.01)
(Continued)

(52) U.S. Cl.
CPC ............... *H02M 7/25* (2013.01); *H02M 1/32* (2013.01); *H04L 12/437* (2013.01); *H04L 12/44* (2013.01); *H04L 2012/421* (2013.01)

(58) Field of Classification Search
CPC .................................. H02M 7/25; H02M 1/32
See application file for complete search history.

(56) References Cited

U.S. PATENT DOCUMENTS 6,111,767 A * 8/2000 Handleman ....... H02M 7/53871
363/95
2015/0333650 A1 11/2015 Park
(Continued)

FOREIGN PATENT DOCUMENTS

EP          2905889 A1    8/2015
JP       2006277378 A    10/2006
(Continued)

OTHER PUBLICATIONS

Extended European Search Report dated Apr. 21, 2022, issued in corresponding European Patent Application No. 19929592.4, 9 pages.
(Continued)

*Primary Examiner* — Gary L Laxton
(74) *Attorney, Agent, or Firm* — BUCHANAN INGERSOLL & ROONEY PC

(57) ABSTRACT

A power conversion device includes a host device to control each submodule, and a plurality of repeating devices to relay communication between the host device and each submodule. The host device includes a command information generator to generate command information including an arm command, and a communication controller provided for each arm. Each of a plurality of communication controllers extracts, from the command information, an arm command associated with the communication controller, and transmits a communication frame including the extracted arm command to a repeating device that is connected to each submodule included in the arm associated with the communication controller.

20 Claims, 17 Drawing Sheets

(51) Int. Cl.
      *H04L 12/437*    (2006.01)
      *H04L 12/44*     (2006.01)
      *H04L 12/42*     (2006.01)

(56) References Cited

U.S. PATENT DOCUMENTS

| | | |
|---|---|---|
| 2018/0358887 A1* | 12/2018 | Jebenstreit .......... H02M 7/5387 |
| 2020/0259411 A1 | 8/2020 | Ido et al. |
| 2021/0075339 A1 | 3/2021 | Ido et al. |

FOREIGN PATENT DOCUMENTS

| | | |
|---|---|---|
| JP | 2015130746 A | 7/2015 |
| JP | 2015220993 A | 12/2015 |
| JP | 6425855 B1 | 11/2018 |
| WO | 2013111269 A1 | 8/2013 |
| WO | 2018158935 A1 | 9/2018 |

OTHER PUBLICATIONS

International Search Report (PCT/ISA/210) with translation and Written Opinion (PCT/ISA/237) dated Jul. 2, 2019, by the Japan Patent Office as the International Searching Authority for International Application No. PCT/JP2019/020106. (8 pages).

* cited by examiner

POWER CONVERSION DEVICE

TECHNICAL FIELD

The present disclosure relates to a power conversion device converting AC power into DC power and vice versa.

BACKGROUND ART

The Modular Multilevel Converter (MMC) is known as a self-excited power conversion device used for a DC power transmission system. The Modular Multilevel Converter includes, for each phase of AC, an upper arm connected to a high-potential-side DC terminal and a lower arm connected to a low-potential-side DC terminal. Each arm is made up of a plurality of cascaded submodules.

For example, Japanese Patent Laying-Open No. 2015-130746 (PTL 1) discloses a power conversion device including a power conversion circuit capable of converting AC to DC or DC to AC. The power conversion circuit includes an arm in which a plurality of unit converters are connected in series to each other. The power conversion device further includes a first control device that perform central control for each of the unit converters, a plurality of second control devices that are daisy-chain connected to the first control device, and a third control device connected to the second control device to control each of the unit converters.

CITATION LIST

Patent Literature

PTL 1: Japanese Patent Laying-Open No. 2015-130746

SUMMARY OF INVENTION

Technical Problem

According to PTL 1, a central control device is connected to a plurality of intermediate control devices. The central control device transmits a communication frame including an object arm number, and a cell control unit of the intermediate control device sets the carrier phase of the cell control unit to a predetermined value when the object arm number 404 is identical to the ID number of the arm to which the cell control unit belongs. Therefore, in order to provide commands to all the arms, it is necessary to transmit the communication frame the same number of times as the number of arms.

An object of the present disclosure according to an aspect is to provide a power conversion device capable of transmitting a command to each of the submodules included in each arm in as short a time as possible.

Solution to Problem

In accordance with an embodiment, a power conversion device performing power conversion between a DC circuit and an AC circuit is provided. The power conversion device includes power conversion circuitry including a leg circuit for each phase of the AC circuit. The leg circuit includes a first arm and a second arm. The first arm and the second arm each include a plurality of submodules connected in series to each other. The power conversion device includes a host device to control each submodule included in the power conversion circuitry, and a plurality of repeating devices to relay communication between the host device and each submodule included in the power conversion circuitry. The host device includes: a command information generator to generate command information including an arm command for each arm of the arms included in the power conversion circuitry; and a communication controller provided for each leg circuit or each arm of the arms included in the power conversion circuitry. Each communication controller of a plurality of the communication controllers receives the command information transmitted from the command information generator, extracts, from the command information, an arm command associated with the communication controller, and transmits a communication frame including the extracted arm command to at least one of the repeating devices that is connected to each submodule included in a leg circuit or an arm associated with the communication controller.

Advantageous Effects of Invention

According to the present disclosure, a command can be transmitted to each of submodules included in each arm in as short a time as possible.

DESCRIPTION OF EMBODIMENTS

Figure 1:
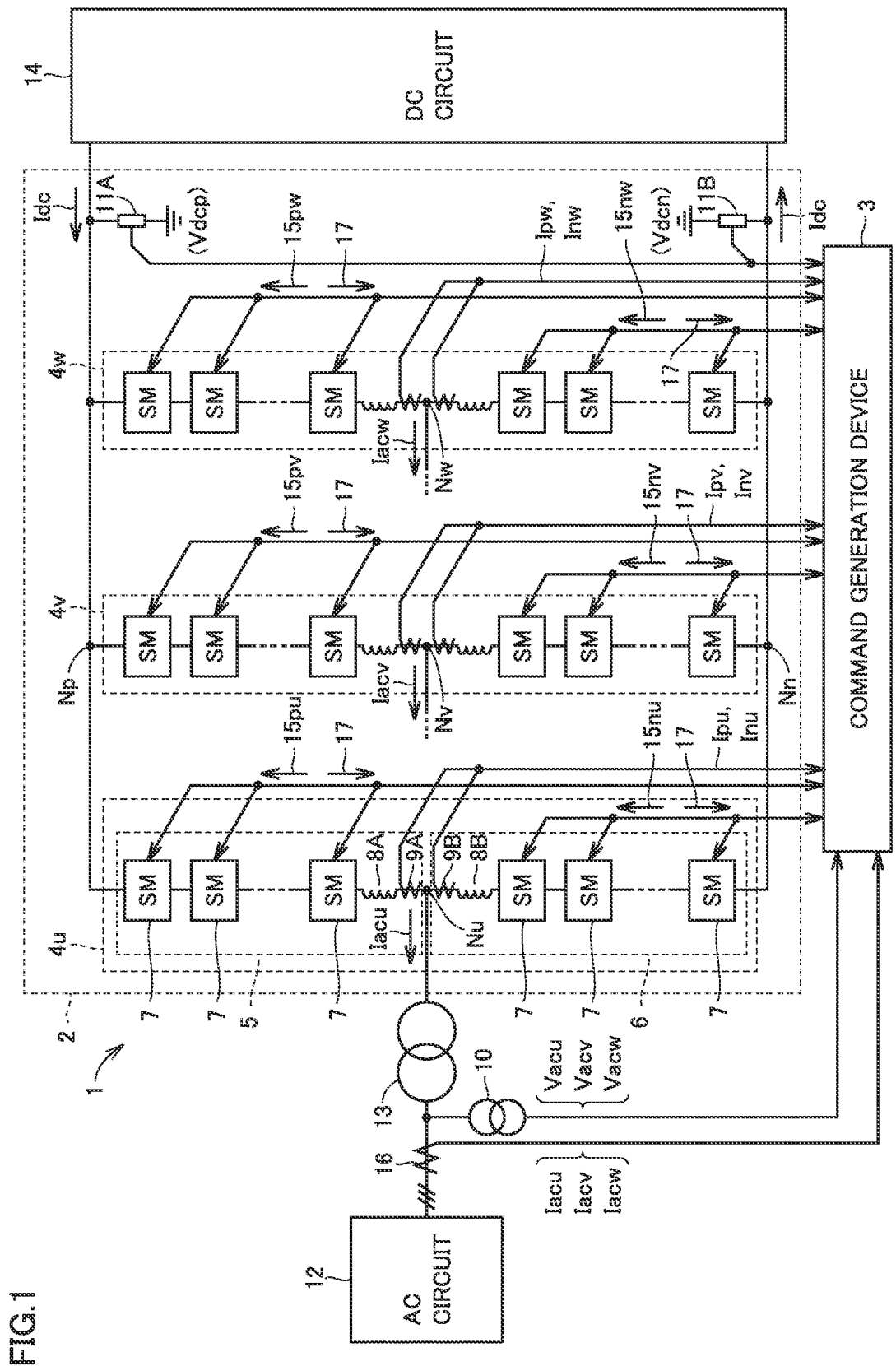
FIG. 1 is a schematic configuration diagram of a power conversion device.

Embodiments of the present disclosure are described hereinafter with reference to the drawings. In the following description, the same components are denoted by the same reference characters. They are named identically and function identically as well. Therefore, a detailed description thereof is not herein repeated.

Embodiment 1

<Configuration of Power Conversion Device>

FIG. 1 is a schematic configuration diagram of a power conversion device. Referring to FIG. 1, power conversion device 1 is configured in the form of a modular multilevel converter including a plurality of submodules (corresponding to "SM" in FIG. 1) 7 connected in series to each other. "Submodule" is also called "converter cell" or "unit converter." Power conversion device 1 performs power conversion between a DC circuit 14 and an AC circuit 12. Specifically, power conversion device 1 includes power conversion circuitry 2 and a command generation device 3.

Power conversion circuitry 2 includes a plurality of leg circuits 4u, 4v, 4w (hereinafter also referred to collectively as "leg circuit 4") connected in parallel with each other between a positive DC terminal (i.e., high-potential-side DC terminal) Np and a negative DC terminal (i.e., low-potential-side DC terminal) Nn.

Leg circuit 4 is provided for each of a plurality of phases of AC. Leg circuit 4 is connected between AC circuit 12 and DC circuit 14 for performing power conversion between the AC circuit and the DC circuit. AC circuit 12 shown in FIG. 1 is a three-phase AC system, and three leg circuits 4u, 4v, 4w are arranged for U phase, V phase, W phase, respectively.

AC input terminals Nu, Nv, Nw arranged respectively in leg circuits 4u, 4v, 4w are each connected through an interconnection transformer 13 to AC circuit 12. AC circuit 12 is an AC power system including an AC power source, for example. FIG. 1 does not show connection between AC input terminals Nv, Nw and interconnection transformer 13 for the sake of simplifying the drawing.

High-potential-side DC terminal Np and low-potential-side DC terminal Nn that are connected commonly to leg circuits 4 are connected to DC circuit 14. DC circuit 14 is a DC terminal for a DC power system including a DC transmission network or the like, or a DC terminal for another power conversion device, for example.

The leg circuits may be connected to AC circuit 12 through an interconnection reactor, instead of interconnection transformer 13 in FIG. 1. Further, instead of AC input terminals Nu, Nv, Nw, primary windings may be arranged in respective leg circuits 4u, 4v, 4w, and AC connection from leg circuits 4u, 4v, 4w to interconnection transformer 13 or the interconnection reactor may be implemented through secondary windings magnetically coupled with the respective primary windings. In this case, the primary windings may be reactors 8A, 8B as described below. Specifically, electrical connection (namely DC or AC connection) from leg circuit 4 to AC circuit 12 may be implemented through connecting parts such as AC input terminals Nu, Nv, Nw or the aforementioned primary windings arranged in respective leg circuits 4u, 4v, 4w.

Leg circuit 4u includes an upper arm 5 from high-potential-side DC terminal Np to AC input terminal Nu, and a lower arm 6 from low-potential-side DC terminal Nn to AC input terminal Nu. The connection point, i.e., AC terminal Nu, between upper arm 5 and lower arm 6 is connected to interconnection transformer 13. High-potential-side DC terminal Np and low-potential-side DC terminal Nn are connected to DC circuit 14. Leg circuits 4v, 4w have a similar configuration to the above-described one, and therefore, leg circuit 4u is explained below as a representative of the leg circuits.

Upper arm 5 includes a plurality of cascaded submodules 7 and reactor 8A. A plurality of submodules 7 and reactor 8A are connected in series to each other. Lower arm 6 includes a plurality of cascaded submodules 7 and reactor 8B. A plurality of submodules 7 and reactor 8B are connected in series to each other.

The position in which reactor 8A is inserted may be any position in upper arm 5 of leg circuit 4u, and the position in which reactor 8B is inserted may be any position in lower arm 6 of leg circuit 4u. More than one reactor 8A and more than one reactor 8B may be arranged. Respective inductance values of the reactors may be different from each other. Alternatively, only reactor 8A of upper arm 5, or only reactor 8B of lower arm 6 may be arranged.

Reactors 8A, 8B are arranged for preventing a sharp increase of fault current generated in the event of a fault in AC circuit 12 or DC circuit 14, for example. Excessively large inductance values of reactors 8A, 8B, however, result in a problem that the efficiency of the power converter is decreased. In the event of a fault, it is therefore preferable to stop (i.e., turn off) all switching devices in each submodule 7 as quickly as possible.

Power conversion device 1 includes, as detection devices for measuring the amount of electricity (current, voltage, for example) to be used for control, an AC voltage detection device 10, an AC current detection device 16, DC voltage detection devices 11A, 11B, and arm current detection devices 9A, 9B disposed in each leg circuit 4.

Signals detected by these detection devices are input to command generation device 3. Based on these detected signals, command generation device 3 outputs operation commands 15pu, 15nu, 15pv, 15nv, 15pw, 15nw for controlling the operating states of respective submodules 7. Command generation device 3 also receives information 17 from each submodule 7. Information 17 is information on the inside of submodule 7 and includes a voltage value of a capacitor 24 in submodule 7 and state information indicating a state of submodule 7, for example.

In the present embodiment, operation commands 15pu, 15nu, 15pv, 15nv, 15pw, 15nw are generated for the U phase upper arm, the U phase lower arm, the V phase upper arm, the V phase lower arm, the W phase upper arm, and the W phase lower arm, respectively. In the following, operation commands 15pu, 15nu, 15pv, 15nv, 15pw, 15nw may be referred to collectively or non-specifically as operation command 15.

For the sake of simplifying the drawing, FIG. 1 shows collectively some of signal lines for signals that are input from respective detection devices to command generation device 3 and signal lines for signals that are input or output between command generation device 3 and respective submodules 7. Actually, however, the signal line is disposed individually for each detection device and each submodule 7. In the present embodiment, these signals are transmitted through optical fibers for the sake of noise immunity.

AC voltage detection device 10 detects U phase AC voltage value Vacu, V phase AC voltage value Vacv, and W phase AC voltage value Vacw of AC circuit 12. AC current detection device 16 detects U phase AC current value Iacu, V phase AC current value Iacv, and W phase AC current value Iacw of AC circuit 12. DC voltage detection device 11A detects DC voltage value Vdcp of high-potential-side DC terminal Np connected to DC circuit 14. DC voltage detection device 11B detects DC voltage value Vdcn of low-potential-side DC terminal Nn connected to DC circuit 14.

Arm current detection devices 9A and 9B disposed in U phase leg circuit 4u detect upper arm current Ipu flowing in upper arm 5 and lower arm current Inu flowing in lower arm 6, respectively. Likewise, arm current detection devices 9A and 9B disposed in V phase leg circuit 4v detect upper arm current Ipv and lower arm current Inv, respectively. Arm current detection devices 9A and 9B disposed in W phase leg circuit 4w detect upper arm current Ipw and lower arm current Inw, respectively.

<Example Configuration of Submodule>

Figure 2:
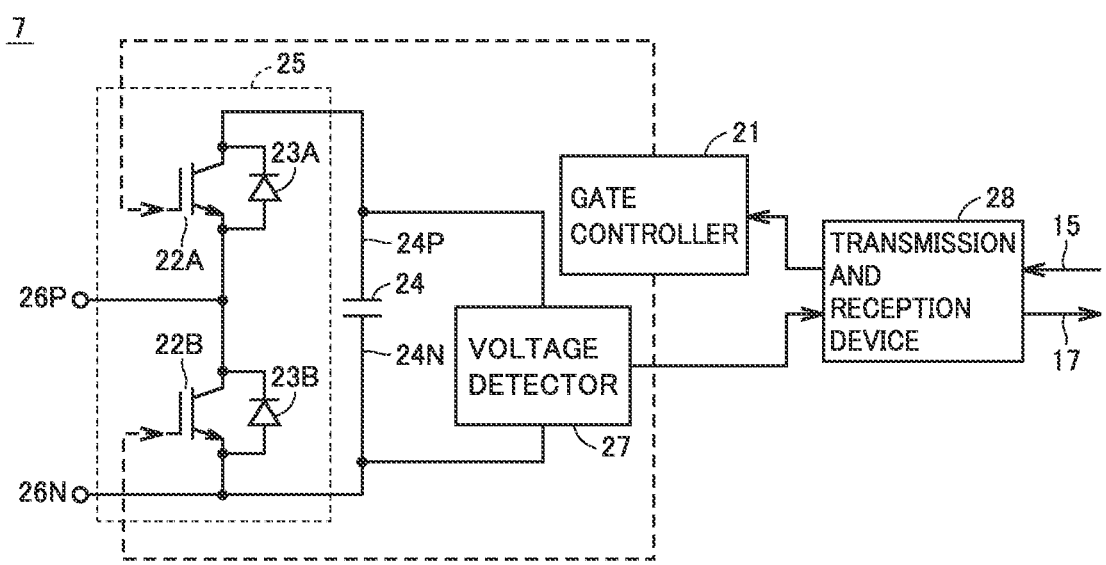
FIG. 2 is a circuit diagram showing an example of submodules forming each leg circuit in FIG. 1.

FIG. 2 is a circuit diagram showing an example of submodules forming each leg circuit in FIG. 1. Referring to FIG. 2, submodule 7 includes a half-bridge-type conversion circuit 25, a capacitor 24 serving as an energy storage device, a gate controller 21, a voltage detector 27, and a transmission and reception device 28. Gate controller 21, voltage detector 27, and transmission and reception device 28 may be implemented by a dedicated circuit, or implemented by an FPGA (Field Programmable Gate Array), or the like.

Conversion circuit 25 includes switching devices 22A, 22B connected in series to each other, and diodes 23A, 23B. Diodes 23A, 23B are connected in anti-parallel (i.e., in parallel in the reverse-bias direction) with switching devices 22A, 22B, respectively. Capacitor 24 is connected in parallel with the series-connected circuit made up of switching devices 22A, 22B for holding a DC voltage. A connection node of switching devices 22A, 22B is connected to a high-potential-side input/output terminal 26P. A connection node of switching device 22B and capacitor 24 is connected to a low-potential-side input/output terminal 26N.

Gate controller 21 operates in accordance with operation command 15 received from command generation device 3 in FIG. 1. During a normal operation (i.e., zero voltage or positive voltage is output between input/output terminals 26P and 26N), gate controller 21 performs control to cause one of switching devices 22A, 22B to be in the ON state and the other to be in the OFF state. While switching device 22A is in the ON state and switching device 22B is in the OFF state, a voltage across capacitor 24 is applied between input/output terminals 26P and 26N. While switching device 22A is in the OFF state and switching device 22B is in the ON state, the voltage between input/output terminals 26P and 26N is 0 V.

Thus, submodule 7 causes switching devices 22A, 22B to become the ON state alternately to thereby output zero voltage or a positive voltage depending on the voltage of capacitor 24.

Voltage detector 27 detects the voltage between opposite terminals 24P and 24N of capacitor 24. Transmission and reception device 28 transmits, to gate controller 21, operation command 15 received from command generation device 3 in FIG. 1, and transmits, to command generation device 3, information 17 including the voltage of capacitor 24 (hereinafter also referred to simply as "capacitor voltage") detected by voltage detector 27.

As each of switching devices 22A, 22B, a self-arc-extinguishing-type switching device is used, of which ON operation and OFF operation can both be controlled. For example, IGBT (Insulated Gate Bipolar Transistor) or GCT (Gate Commutated Turn-off thyristor), for example, is used as switching device 22A, 22B.

The above-described configuration of submodule 7 is given as an example, and submodule 7 of any of other configurations may be applied to the present embodiment. For example, a full-bridge-type conversion circuit or a three-quarter-bridge-type conversion circuit may be used to form submodule 7.

<Configuration of Command Generation Device>

Figure 3:
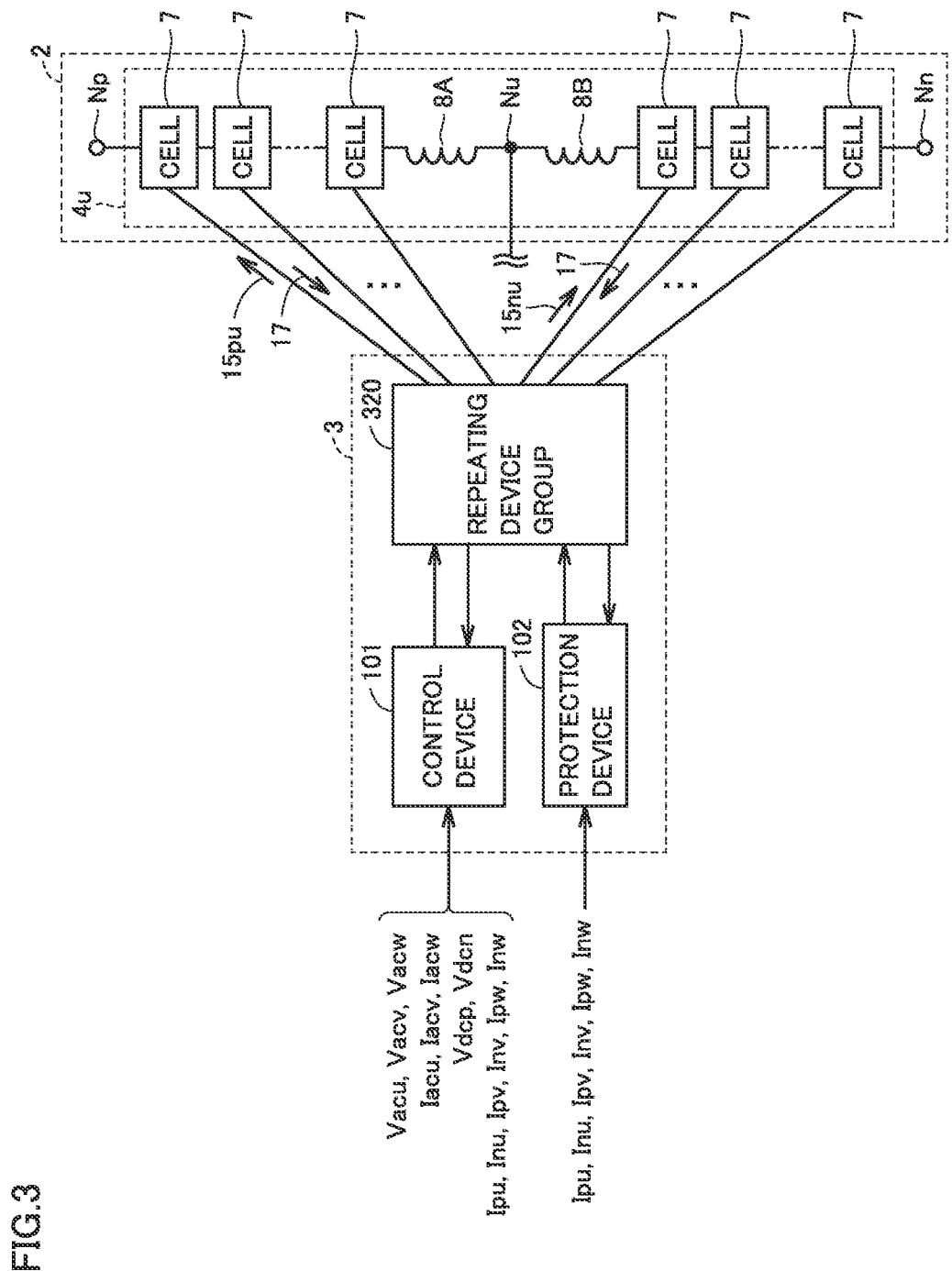
FIG. 3 is a block diagram showing a schematic configuration of a command generation device.

FIG. 3 is a block diagram showing a schematic configuration of the command generation device. Referring to FIG. 3, command generation device 3 includes a control device 101, a protection device 102, and a repeating device group 320 made up of a plurality of repeating devices. Control device 101 and protection device 102 are each a host device of each repeating device included in repeating device group 320. Each repeating device relays communication between the host device and each submodule 7 included in power conversion circuitry 2. While FIG. 3 exemplarily shows only leg circuit 4u for U phase in power conversion circuitry 2 of FIG. 1, other leg circuits 4v, 4w are similar to leg circuit 4u.

Control device 101 is a device that controls operation of each submodule 7. Control device 101 receives input of AC voltage values Vacu, Vacv, Vacw (hereinafter also referred to collectively as "AC voltage value Vac"), AC current values Iacu, Iacv, Iacw (hereinafter also referred to collectively as "AC current value Iac"), DC voltage values Vdcp, Vdcn, upper arm currents Ipu, Ipv, Ipw (hereinafter also referred to collectively as "upper arm current Ip"), lower arm currents Inu, Inv, Inw (hereinafter also referred to collectively as "lower arm current In"), and capacitor voltage Vcap that are detected by respective detection devices in FIG. 1. Typically, capacitor voltage Vcap is an average of respective voltage values of capacitors 24 detected in respective submodules 7 of each arm circuit.

Based on each of the received detected values, control device 101 generates, for each period T1 (86.8 μs, for example), a control command for controlling operation of each submodule 7 during a normal operation control period, and outputs the generated control command to repeating device group 320.

The control command includes a voltage command and a current command, for example. The voltage command is, for example, an output voltage command value for upper arm 5 and an output voltage command value for lower arm 6, in each of leg circuits 4u, 4v, 4w. The current command is, for example, an output current command value for upper arm 5 and an output current command value for lower arm 6, in each of leg circuits 4u, 4v, 4w.

Typically, control device 101 includes, as hardware components, an auxiliary transformer, an AD (Analog to Digital) converter, and an operation unit, for example. The operation unit includes a CPU (Central Processing Unit), a RAM (Random Access Memory), and a ROM (Read Only Memory). The AD converter includes an analogue filter, a sample hold circuit, and a multiplexer, for example. Control device 101 may be configured, for example, in the form of a digital protection control device.

Protection device 102 is a device that protects each submodule 7. When at least one of the arm currents exceeds a threshold value, protection device 102 generates a protection command including a stop command for stopping operation of each submodule 7 and transmits the protection command to each repeating device 32. In contrast, when all the arm currents are less than the threshold value, protection device 102 may not generate a protection command, or may generate a protection command including a normal command for causing each submodule 7 to operate based on the control command. Protection device 102 transmits the protection command for each period T2 (a few microseconds, for example).

Repeating device group 320 receives the control command from control device 101 and receives the protection command from protection device 102. Repeating device group 320 outputs, to each submodule 7, operation command 15 including at least one of the control command and the protection command. Each submodule 7 operates in accordance with operation command 15.

<Transmission Method for Command Information>

Figure 4:
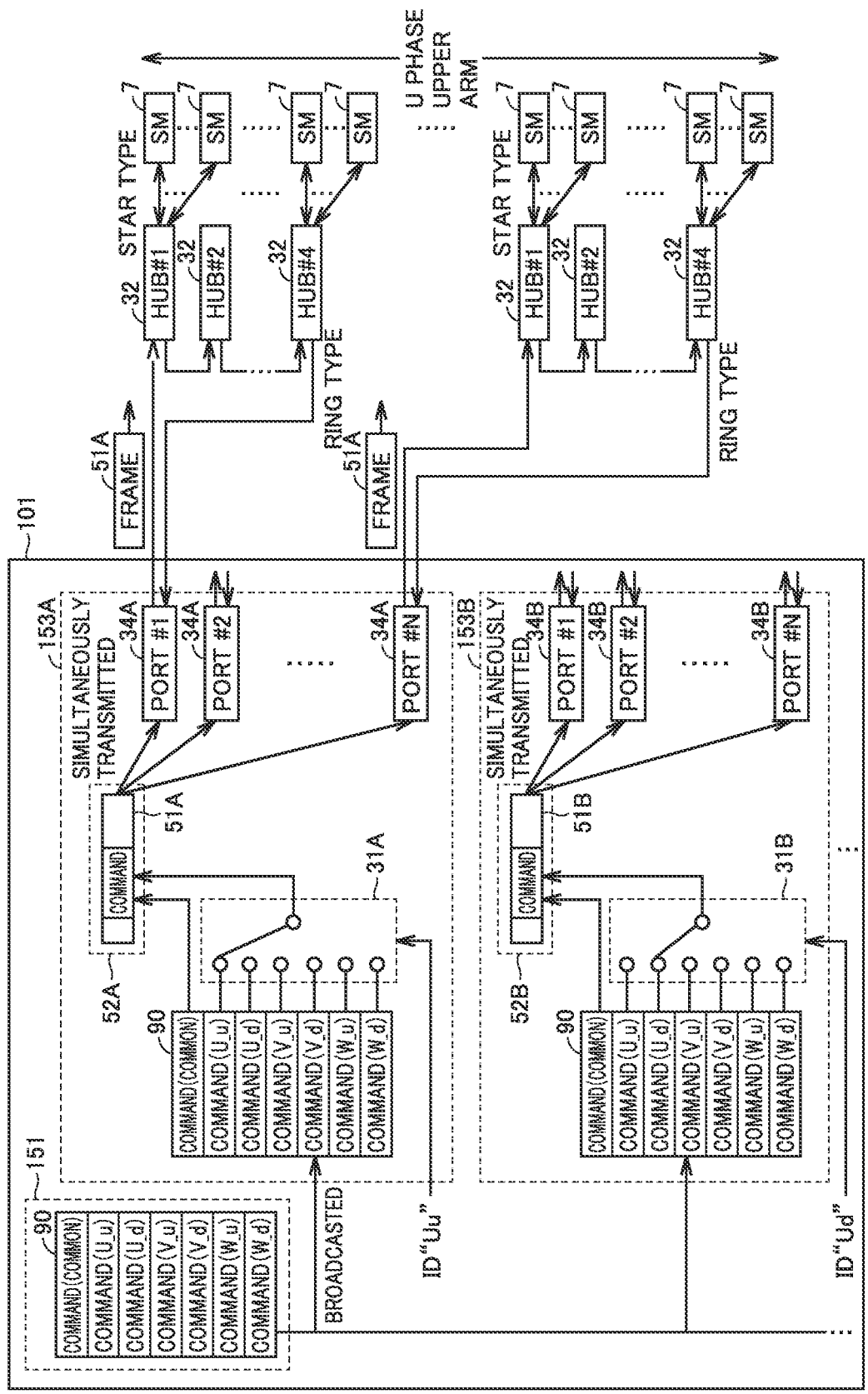
FIG. 4 illustrates a method for transmitting command information according to Embodiment 1.

FIG. 4 illustrates a method for transmitting command information according to Embodiment 1. The method for transmitting the control command from control device 101 to repeating device group 320 is similar to the method for transmitting the protection command from protection device 102 to repeating device group 320. In the following description, it is therefore supposed that control device 101 is a host device. The same applies to other embodiments as well.

Referring to FIG. 4, control device 101 includes a command information generator 151 and a plurality of communication controllers 153A, 153B (hereinafter also referred to collectively as "communication controller 153"). Respective functions of these components are implemented through execution, by a CPU of control device 101, of a program stored in a ROM, for example. Alternatively, a part or the whole of these functions may be implemented through use of a dedicated circuit.

Command information generator 151 generates command information 90 including arm commands for respective arms (i.e., upper and lower arms for each of the phases) included in power conversion circuitry 2. Because control device 101 is herein supposed to be a host device, command information 90 corresponds to the control command. Command information 90 includes a common command that is common to arms (upper and lower arms for each of the phases) included in power conversion circuitry 2, and arm commands dedicated to upper and lower arms for each of the phases. Specifically, the arm commands include arm command U_u for upper arm 5 of the U phase, arm command U_d for lower arm 6 of the U phase, arm command V_u for upper arm 5 of the V phase, arm command V_d for lower arm 6 of the V phase, arm command W_u for upper arm 5 of the W phase, and arm command W_d for lower arm 6 of the W phase.

The common command includes a mode command specifying an operation mode of each submodule 7, and the total number of submodules 7 included in power conversion circuitry 2. The operation mode includes an activation mode for activating submodule 7, an operation mode for causing submodule 7 to operate in a normal manner, and a pause mode for causing submodule 7 to pause.

Each arm command includes an arm voltage command value, an arm current command value, and an arm test command. The arm test command includes a command for starting test charging for capacitor 24 of submodule 7 in an arm, and a command for stopping the test charging.

Figure 5:
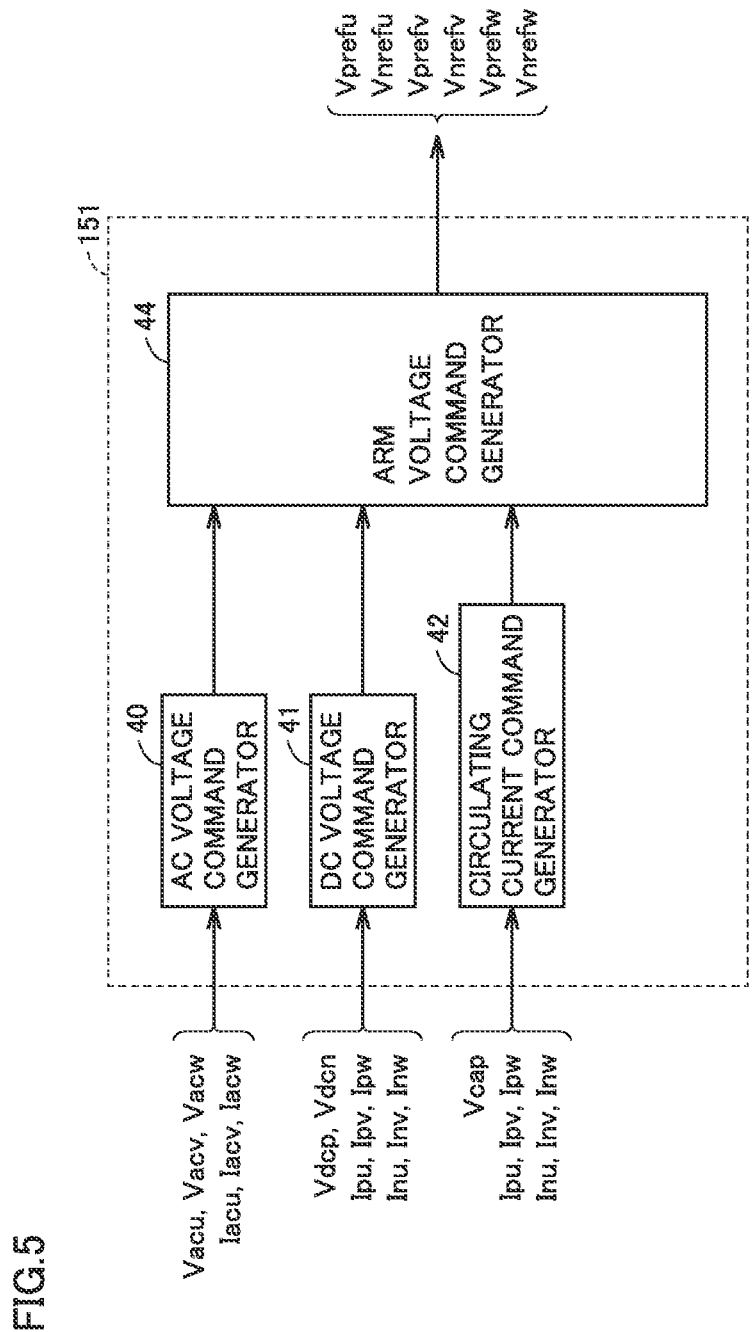
FIG. 5 illustrates an example of a method for generating arm voltage commands.

FIG. 5 illustrates an example of a method for generating arm voltage commands. Referring to FIG. 5, command information generator 151 of control device 101 includes, as functional components for generating arm voltage commands, an AC voltage command generator 40, a DC voltage command generator 41, a circulating current command generator 42, and an arm voltage command generator 44. These functional components are configured in the form of a feedback controller such as PID controller (Proportional-Integral-Differential Controller), for example.

AC voltage command generator 40 generates an AC voltage command value for each phase, based on AC voltage values Vacu, Vacv, Vacw and AC current values Iacu, Iacv, Iacw. DC voltage command generator 41 calculates DC current value Idc, based on upper arm currents Ipu, Ipv, Ipw and lower arm currents Inu, Inv, Inw. DC voltage command generator 41 generates a DC voltage command value based on DC voltage values Vdcp, Vdcn and DC current value Idc.

Circulating current command generator 42 calculates circulating currents Iccu, Iccv, Iccw flowing in respective leg circuits 4u, 4v, 4w, based on upper arm currents Ipu, Ipv, Ipw and lower arm currents Inu, Inv, Inw of respective phases. The circulating currents circulate through a plurality of leg circuits 4. Circulating current command generator 42 calculates a command value for the circulating current of each phase, based on circulating currents Iccu, Iccv, Iccw of respective phases and capacitor voltage Vcap which is an average determined for each arm circuit.

Arm voltage command generator 44 generates arm voltage commands Vprefu, Vnrefu, Vprefv, Vnrefv, Vprefw, Vnrefw for upper arm 5 and lower arm 6 for each of the phases, based on the above-described command generators.

Referring again to FIG. 4, command information generator 151 broadcasts command information 90 to communication controllers 153 for respective arms. Communication controller 153 is provided for each arm. For ease of drawing, FIG. 4 only shows communication controller 153A for upper arm 5 of the U phase and communication controller 153B for lower arm 6 of the U phase. Actually, however, control device 101 additionally includes two communication controllers 153 for upper and lower arms of the V phase, and two communication controllers 153 for upper and lower arms of the W phase. Respective functions of communication controllers 153 for respective arms are similar to each other, and therefore, functions of communication controllers 153A, 153B for the U phase are described herein.

Communication controller 153A receives command information 90 transmitted from command information generator 151, and extracts, from command information 90, arm command U_u associated with communication controller 153A. Communication controller 153A transmits a communication frame 51A including extracted arm command U_u, to each repeating device 32 connected to associated submodules 7 in the U phase upper arm associated with communication controller 153A. Specifically, communication controller 153A includes a selector 31A, a communication frame generator 52A, and a plurality of communication ports 34A.

Selector 31A selects arm command U_u associated with select ID "Uu" that is specified for selector 31A, and outputs the selected arm commend to communication frame generator 52A. For example, when each communication controller 153 is formed from a circuit board, a slot number where the circuit board is mounted is specified as a select ID. Specifically, when communication controller 153A is inserted in a slot for the U phase upper arm, select ID "Uu" is automatically specified for selector 31A of communication controller 153A. This makes it unnecessary to manually make settings for communication controller 153, from which advantageous effects such as saving of the load for initial settings, and prevention of an erroneous number from being specified, for example, are expected. The function of selector 31A may be implemented in a software manner.

Communication frame generator 52A extracts the common command from command information 90, and also extracts arm command U_u selected by selector 31A. Communication frame generator 52A generates communication frame 51A including command data having the common command and arm command U_u. Communication frame generator 52A transmits, through each communication port 34A, communication frame 51A to associated repeating device 32.

N communication ports 34A (N is an integer satisfying N 1) are provided. For the sake of convenience, N communication ports 34A are distinguished from each other by respective numbers #1 to #N allocated to them. Communication frame generator 52A transmits communication frame 51A simultaneously to communication ports 34A#1 to 34A#N. Communication ports 34A#1 to 34A#N each transmit communication frame 51A to associated repeating device 32.

Each communication controller 153 is connected to a plurality of repeating devices 32 through a ring network. For example, each communication port 34 of communication controller 153 is connected to four repeating devices 32 through a ring network. Four repeating devices 32 are also referred to as HUB#1 to HUB#4, respectively.

Each repeating device 32 is connected to a predetermined number of submodules 7 through a star network. Each repeating device 32 extracts the command data included in communication frame 51A and transmits a communication frame including the command data to each submodule 7 connected to this repeating device 32. In the example shown in FIG. 4, the ring network topology and the star network topology are combined to establish a network interconnecting control device 101, repeating devices 32, and submodules 7.

Communication controller 153B receives command information 90 transmitted from command information generator 151, and extracts, from command information 90, arm command U_d associated with communication controller 153B. Communication controller 153B transmits a communication frame 51B including extracted arm command U_d, to each repeating device 32 connected to associated submodules 7 in the U phase lower arm associated with communication controller 153B. Specifically, communication controller 153B includes a selector 31B, a communication frame generator 52B, and a plurality of communication ports 34B.

Selector 31B selects arm command U_d associated with select ID "Ud" that is specified for selector 31B, and outputs the selected arm commend to communication frame generator 52B. Communication frame generator 52B generates communication frame 51B including the common command and arm command U_d, and transmits, through each communication port 34B, communication frame 51B to associated repeating device 32. While each communication port 34B is connected to associated repeating devices 32 through a ring network, the connection is not shown for ease of drawing. Communication controllers 153 for the upper and lower arms of the V phase as well as communication controllers 153 for the upper and lower arms of the W phase also transmit respective communication frames to each repeating device 32.

Thus, when communication controller 153 is provided for each arm, each of a plurality of communication controllers 153 transmits, to repeating devices 32 connected to associated submodules 7 included in the arm (e.g., U phase upper arm) which is associated with this communication controller 153, a communication frame (communication frame 51A, for example) including the arm command (arm command U_u, for example) for that arm.

In the above-described configuration, the communication frame is transmitted for each arm, and therefore, it is unnecessary for the communication frame to include information specifying the arm. Control device 101 can therefore transmit a relevant arm command simultaneously to submodules 7 in each arm, which enables shortening of the communication time required for control device 101 to transmit the command.

The above description regarding FIG. 4 is given of the case where the host device is control device 101. If the host device is protection device 102, command information 90 corresponds to the protection command. In this case, the common command in command information 90 includes a stop command for stopping operation of submodules 7 in all the arms. Each arm command in command information 90 includes a stop command for stopping operation of each submodule in the associated arm. For example, arm command U_u generated by the command information generator of protection device 102 includes a stop command for stopping operation of each submodule 7 in the U phase upper arm. This configuration similar to that of control device 101 described above also enables shortening of the communication time required for protection device 102 to transmit the command.

Figure 6:
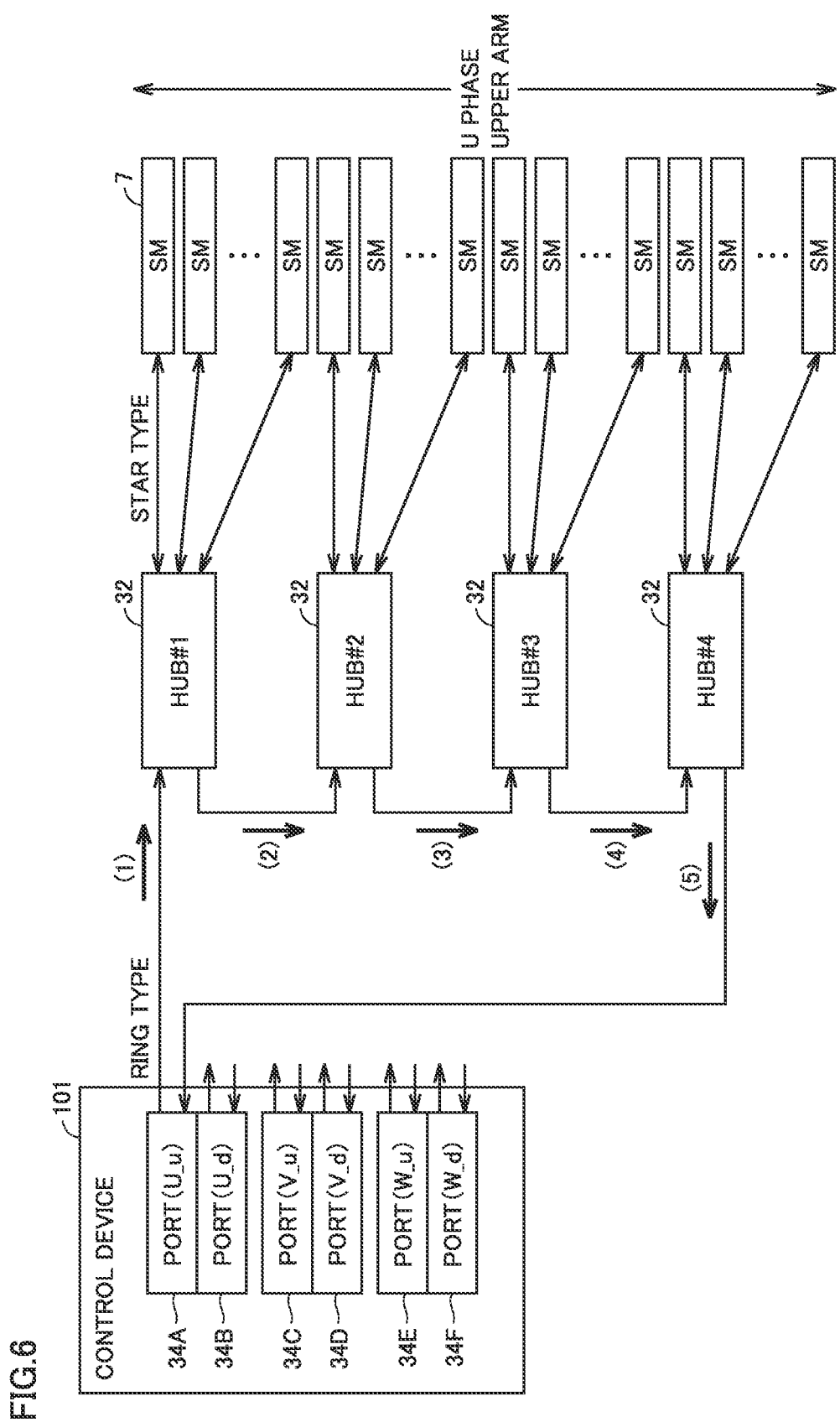
FIG. 6 illustrates an example network configuration according to Embodiment 1.
Figure 7:
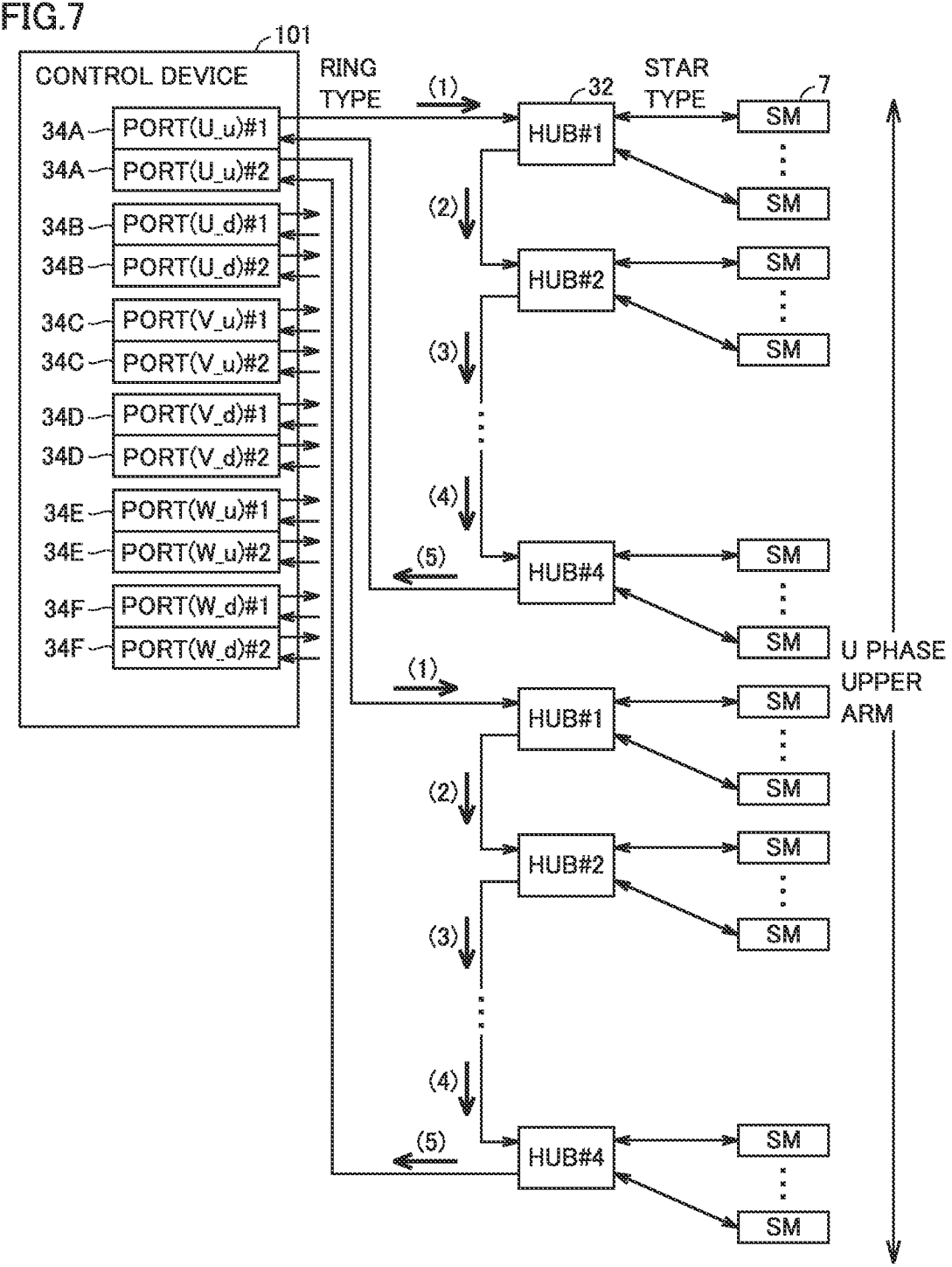
FIG. 7 illustrates another example network configuration according to Embodiment 1.

Referring next to FIGS. 6 and 7, specific examples of network configuration interconnecting control device 101 and repeating devices 32 are described. FIG. 6 illustrates an example network configuration according to Embodiment 1. Specifically, FIG. 6 shows a network configuration where the number N of communication ports in FIG. 4 is one.

Referring to FIG. 6, control device 101 includes a communication port 34A for the U phase upper arm, a communication port 34B for the U phase lower arm, a communication port 34C for the V phase upper arm, a communication port 34D for the V phase lower arm, a communication port 34E for the W phase upper arm, and a communication port 34F for the W phase lower arm.

Communication port 34A is connected to four repeating devices 32 through the ring topology. Each repeating device 32 is connected to a plurality of submodules 7 through the star topology. Communication frame 51A that is output from communication port 34A is transmitted in the order of the numerals in the parentheses in FIG. 6, i.e., (1), (2), (3), (4), (5). The method for transmitting communication frames that are output from respective communication ports 34B to 34F is similar to the method for transmitting the communication frame that is output from communication port 34A.

Specifically, control device 101 transmits communication frame 51A to HUB#1 through communication port 34A. HUB#1 processes communication frame 51A received from control device 101 and transmits the frame to HUB#2. HUB#2 processes communication frame 51A received from HUB#1 and transmits the frame to HUB#3. HUB#3 processes communication frame 51A received from HUB#2 and transmits the frame to HUB#4. HUB#4 processes communication frame 51A received from HUB#3 and transmits the frame to control device 101. Details of how communication frame 51A is processed are described later herein.

FIG. 7 illustrates another example network configuration according to Embodiment 1. Specifically, FIG. 7 shows a network configuration where the number N of communication ports in FIG. 4 is two. Referring to FIG. 7, control device 101 includes two communication ports 34A, two communication ports 34B, two communication ports 34C, two communication ports 34D, two communication ports 34E, and two communication ports 34F.

Each of two communication ports 34A is connected to four repeating devices 32 through the ring topology. Each repeating device 32 is connected to a plurality of submodules 7 through the star topology. Communication frame 51A that is output from each communication port 34A is transmitted in the order of the numerals in parentheses in FIG. 7, i.e., (1), (2), (3), (4), (5), like the one shown in FIG. 6.

<Example of Processing of Communication Frame by Repeating Devices>

Figure 8:
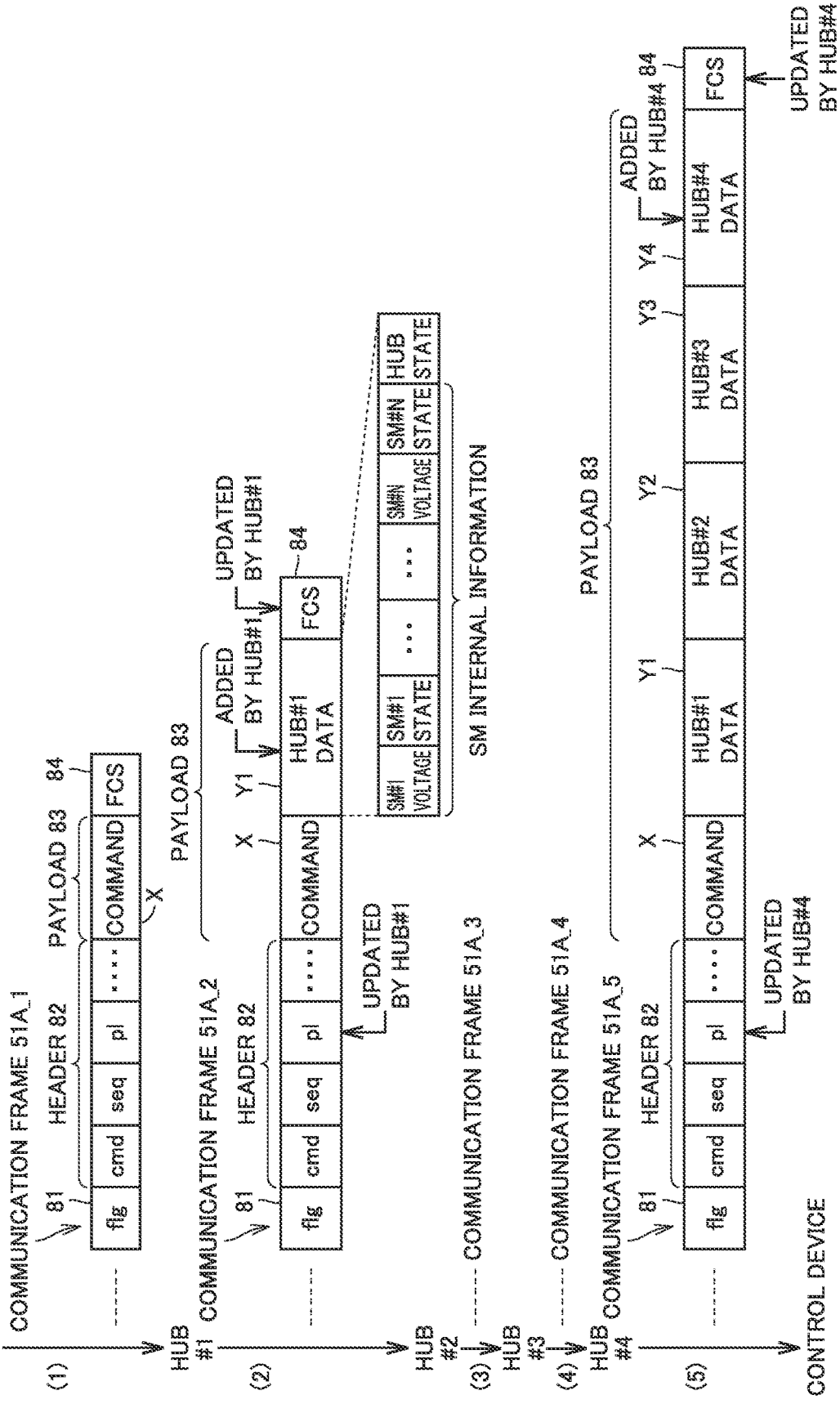
FIG. 8 illustrates an example of processing of a communication frame by repeating devices according to Embodiment 1.

FIG. 8 illustrates an example of processing of a communication frame by repeating devices according to Embodiment 1. Communication frames transmitted through respective communication ports of control device 101 are processed in a similar manner. Therefore, an example of processing of communication frame 51A transmitted from control device 101 through communication port 34A is described. The numerals in parentheses (1), (2), (3), (4), (5) in FIG. 8 correspond to those in FIG. 6.

Communication frame 51A transmitted from control device 101 to HUB#1 is also referred to as "communication frame 51A_1," communication frame 51A transmitted from HUB#1 to HUB#2 is also referred to as "communication frame 51A_2," communication frame 51A transmitted from HUB#2 to HUB#3 is also referred to as "communication frame 51A_3," communication frame 51A transmitted from HUB#3 to HUB#4 is also referred to as "communication frame 51A_4," and communication frame 51A transmitted from HUB#4 to control device 101 is also referred to as "communication frame 51A_5."

Referring to FIG. 8, communication frame 51A_1 includes a flag region 81 (corresponding to "flg" in the drawing), a header region 82, a payload region 83, and an FCS (Frame Check Sequence) region 84 where error detection information is stored. In header region 82, information such as a communication command (corresponding to "cmd" in the drawing), a sequence number (corresponding to "seq" in the drawing), and a payload length (corresponding to "pl" in the drawing), for example, is stored. In payload region 83, command data X including the common command and arm command U_u is stored.

Receiving communication frame 51A_1 from communication controller 153A connected to HUB#1, HUB#1 processes communication frame 51A_1 to generate communication frame 51A_2. Specifically, HUB#1 adds HUB data Y1 to the payload region of communication frame 51A_1, and updates the payload length and FCS region 84 to generate communication frame 51A_2. HUB#1 transmits communication frame 51A_2 to HUB#2 connected to HUB#1.

HUB#1 generates HUB data Y1 based on internal information (hereinafter also referred to as "SM internal information") received from each submodule 7 connected to HUB#1. HUB data Y1 includes the SM internal information received from each submodule 7 and state information about HUB#1 ("HUB state" in the drawing).

The SM internal information includes the capacitor voltage of each submodule 7 (corresponding to "SM#1 voltage to SM#N voltage" in the drawing), and the state information of each submodule 7 ("SM#1 state to SM#N state" in the drawing). In the following description, the capacitor voltage of submodule 7 is also referred to as "SM voltage," the state information of submodule 7 is also referred to as "state information Dsm," and the state information of the HUB is also referred to as "state information Dh."

State information Dsm includes operational information indicating an operational state of submodule 7, failure rank information indicating the degree of failure, and failure type information indicating the type of failure. The operational information of submodule 7 includes an activation bit indicating whether the submodule is active or not, a failure bit indicating whether the submodule is failing or not, and a separation bit depending on the failure bit indicating a failure state. The separation bit is information indicating whether failing submodule 7 has been separated from the arm. The failure rank information includes information indicating whether submodule 7 can operate or not. The operational information may also include a control bit indicating whether operation of the submodule is being controlled or not, and a stop bit indicating whether the submodule is being stopped or not.

State information Dh of HUB#1 includes operational information indicating an operational state of HUB#1, failure rank information indicating the degree of failure of HUB#1, and failure type information indicating the type of failure. The operational information of HUB#1 includes an operational bit indicating whether HUB#1 is operating in a normal manner, or failing. The failure rank information includes information indicating whether HUB#1 can operate or not.

HUB#2 adds HUB data Y2 to communication frame 51A_2, and updates the payload length and FCS region 84 to generate communication frame 51A_3. HUB#3 adds HUB data Y3 to communication frame 51A_3, and updates the payload length and FCR region 84 to generate communication frame 51A_4. HUB#4 adds HUB data Y4 to communication frame 51A_4 received from HUB#3 connected to HUB#4, and updates the payload length and FCS region 84 to generate communication frame 51A_5. HUB#4 transmits communication frame 51A_5 to control device 101.

HUB data Y2 includes SM internal information received from each submodule 7 connected to HUB#2, and the state information of HUB#2. The same applies as well to HUB data Y3, Y4. Accordingly, as shown in FIG. 8, command data X and HUB data Y1 to Y4 are stored in payload region 83 of communication frame 51A_5. Thus, to the communication frame transmitted from control device 101, an HUB data field is coupled each time the communication frame is passed through the HUB. Communication frames 51A_1 to 51A_5 therefore have respective formats different from each other.

In the above-described configuration, communication frame 51A is transmitted from control device 101 through communication port 34A to thereby allow command data X to be conveyed to each repeating device 32 for the U phase upper arm and also allow HUB data Y1 to Y4 of respective repeating devices 32 to be acquired. Likewise, communication frames for other arms are transmitted from other communication ports to thereby allow command data to be conveyed to respective repeating devices 32 for other arms and allow HUB data of respective repeating devices 32 to be acquired.

In other words, as control device 101 performs communication once, conveyance of the command data to all repeating devices 32 connected to control device 101 as well as acquisition of HUB data of all repeating devices 32 are performed simultaneously. Thus, according to the present embodiment, the frequency at which communication is performed can be reduced and the time required for communication can be shortened, as compared with the method, for example, specifying the ID number of repeating device 32 and the ID number of submodule 7 to make communication individually. Moreover, depending on the number of repeating devices 32, the communication frame is extended automatically. For example, even when one repeating device 32 is added afterward, it is unnecessary to change the structure of the communication frame to be transmitted from control device 101.

The above description regarding FIG. 8 is given of the case where the host device is control device 101. If the host device is protection device 102, SM internal information includes state information Dsm and does not include the SM voltage. Specifically, HUB data includes state information Dsm and state information Dh. The foregoing is applied similarly in other respects.

Advantages

According to Embodiment 1, because the communication frame is not required to include information that specifies an arm, the command for all arms can be transmitted simultaneously. Therefore, the communication time required for conveying the command can be shortened. Moreover, because information that specifies an arm is unnecessary, the frame length of the communication frame can be shortened.

Moreover, as the host device makes communication once, conveyance of command data from the host device to repeating device 32 and acquisition of HUB data of repeating device 32 are performed simultaneously. Therefore, the frequency at which communication is performed between the host device and repeating device 32 can be reduced and the time required for communication can be shortened. Further, because the communication frame is extended automatically depending on the number of repeating devices 32, it is unnecessary to change the structure of the communication frame, even when repeating device 32 is added afterward.

Embodiment 2

The above description regarding Embodiment 1 is given of the configuration where HUB data is added to the communication frame as the communication frame is passed through each HUB. In connection with Embodiment 2, a description is given of a configuration where aggregate data, which is generated by performing data aggregation, is added to the communication frame when the communication frame is passed through each HUB.

Figure 9:
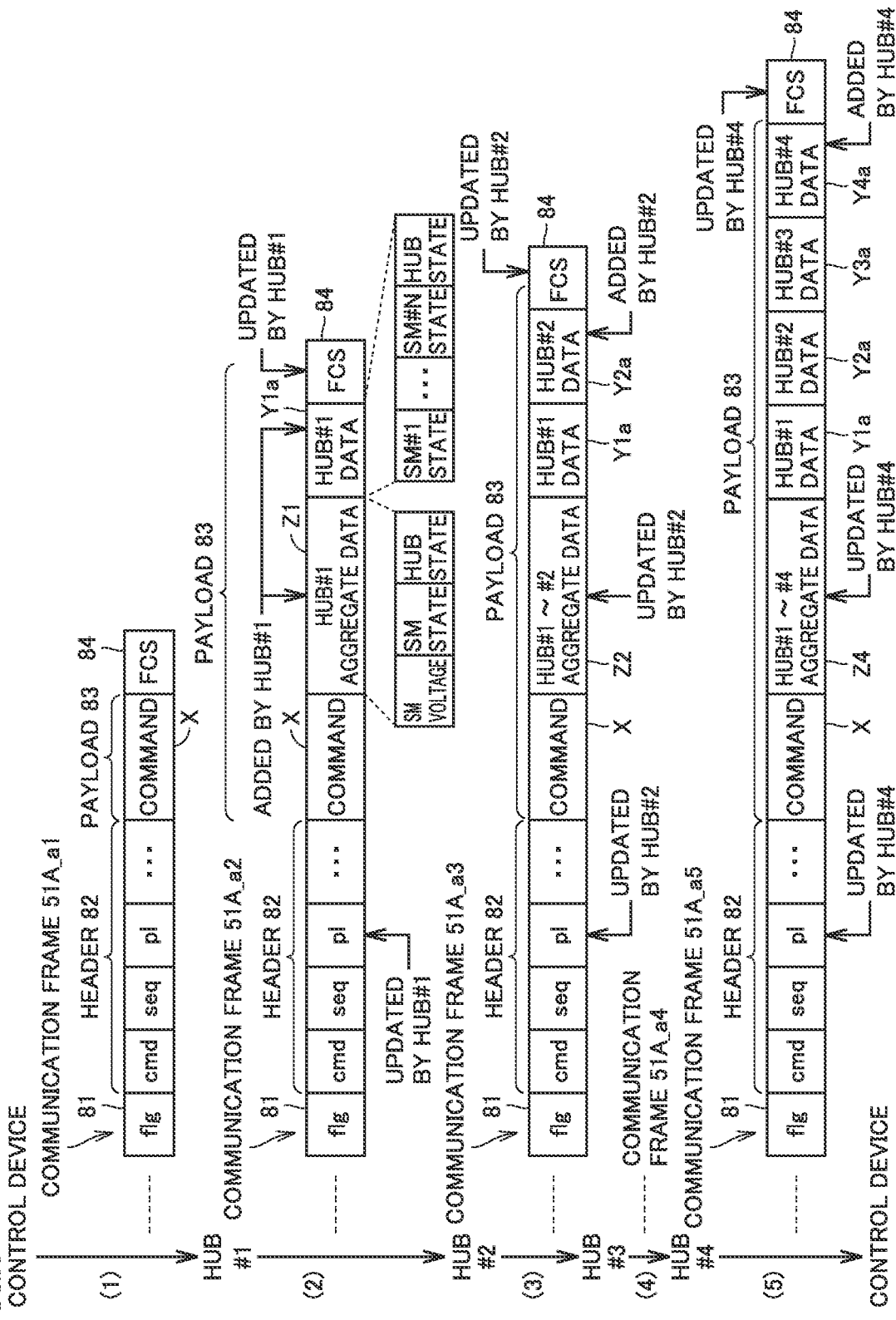
FIG. 9 illustrates processing of a communication frame by repeating devices according to Embodiment 2.

FIG. 9 illustrates processing of a communication frame by repeating devices according to Embodiment 2. For ease of description, example processing of communication frame 51A is described. The numerals in the parentheses (1), (2), (3), (4), (5) in FIG. 9 correspond respectively to the numerals in the parentheses in FIG. 6.

Referring to FIG. 9, a communication frame 51A_a1 transmitted from control device 101 to HUB#1 is identical to communication frame 51A_1 in FIG. 8. A communication frame 51A_a2 transmitted from HUB#1 to HUB#2 differs from communication frame 51A_2 in FIG. 8 in terms of the contents of payload region 83.

HUB#1 generates HUB aggregate data Z1 and HUB data Y1a, based on SM internal information received from each submodule 7 connected to HUB#1. HUB#1 adds HUB aggregate data Z1 and HUB data Y1a to payload region 83 of communication frame 51A_a1, and updates the payload length and FCS region 84 to generate communication frame 51A_a2.

Specifically, payload region 83 of communication frame 51A_a2 includes command data X, HUB aggregate data Z1, and HUB data Y1a. HUB aggregate data Z1 includes an aggregate value of the SM voltage, an aggregate value of state information Dsm, and an aggregate value of state information Dh. HUB data Y1a includes partial information of state information Dsm of submodules 7 connected to HUB#1, and state information Dh of HUB#1. Details of HUB aggregate data Z1 and HUB data Y1a are described later herein.

HUB#2 adds HUB data Y2a to communication frame 51A_a2, and generates HUB aggregate data Z2 by updating HUB aggregate data Z1. Further, HUB#2 updates the payload length and FCS region 84 to generate a communication frame 51A_3a.

Figure 10:
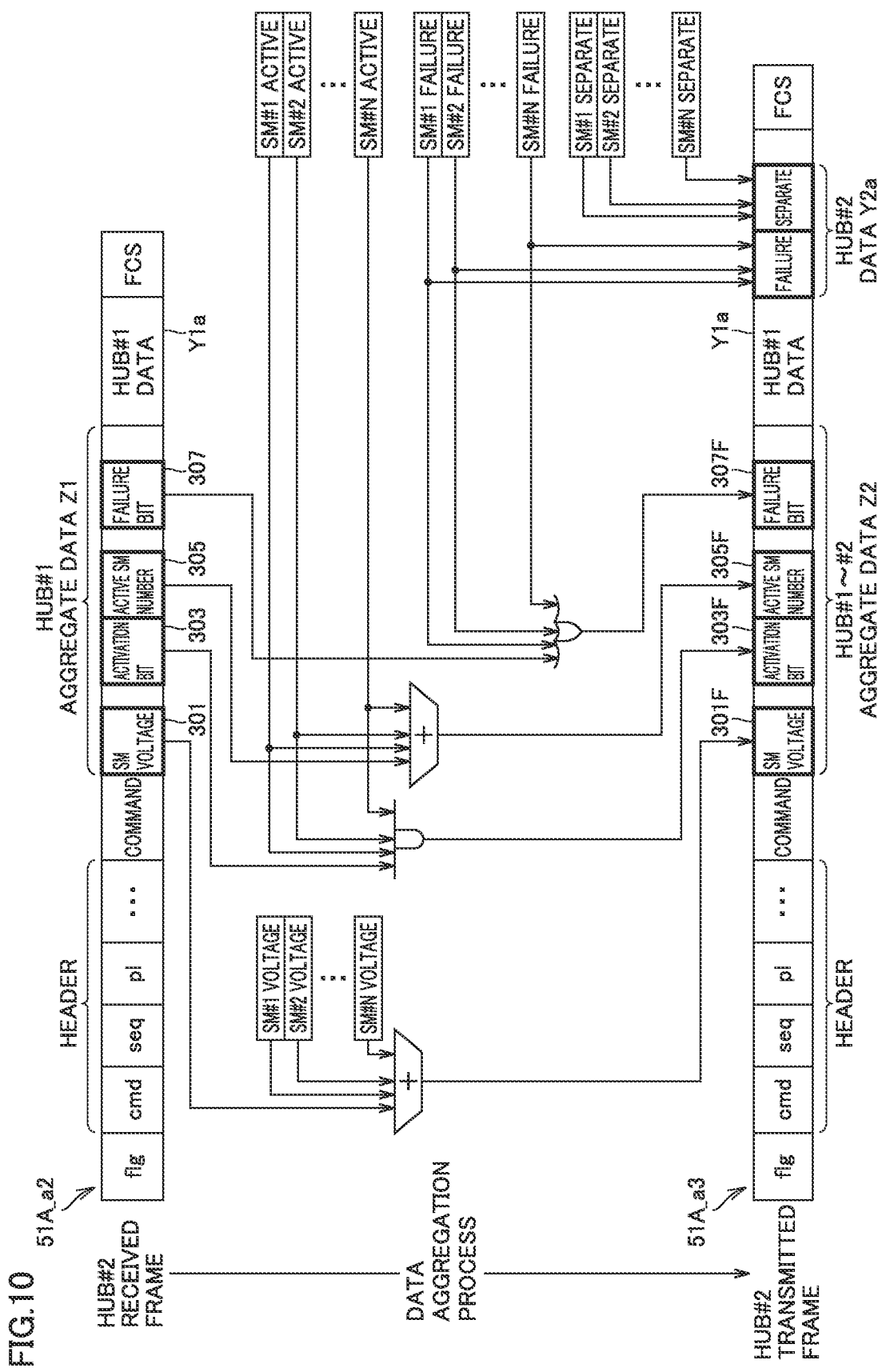
FIG. 10 illustrates a data aggregation process according to Embodiment 2.

FIG. 10 illustrates a data aggregation process according to Embodiment 2. A data aggregation process performed by HUB#2 is chiefly described herein. Referring to FIG. 10, HUB#1 uses SM internal information of each submodule 7 connected to HUB#1 to perform a data aggregation process and thereby generate HUB aggregate data Z1. An SM voltage aggregate value 301 in HUB aggregate data Z1 is the sum of SM voltages received from respective submodules 7 connected to HUB#1.

In aggregate data Z1, the aggregate value of state information Dsm includes an activation bit aggregate value 303, an active SM number aggregate value 305, and a failure bit aggregate value 307. Activation bit aggregate value 303 is the logical conjunction of activation bits received from respective submodules 7. For example, when all submodules 7 connected to HUB#1 are active, the logical conjunction is "1" and, when at least one submodule 7 is not active, the logical conjunction is "0." The value of the logical conjunction can be used to determine whether or not all submodules 7 connected to HUB#1 are active.

Active SM number aggregate value 305 is the sum of activation bits received from respective submodules 7. The sum corresponds to the number of submodules 7 that have been activated, among submodules 7 connected to HUB#1.

Failure bit aggregate value 307 is the logical disjunction of failure bits received from respective submodules 7. For example, when none of all submodules 7 connected to HUB#1 has failed, the logical disjunction is "0" and, when at least one submodule 7 has failed, the logical disjunction is "1." The value of the logical disjunction can be used to determine whether any submodule 7 is failing among submodules 7 connected to HUB#1.

HUB data Y1a includes partial information of state information Dsm, and state information Dh. Specifically, HUB data Y1a includes failure bit, separation bit, failure rank information and failure type information that are included in state information Dsm of each submodule 7, and also includes state information Dh of HUB#1. Thus, because HUB data Y1a does not include the SM voltage and the activation bit of submodule 7, the size of HUB data Y1a is smaller than the size of HUB data Y1 in FIG. 8.

HUB#2 updates HUB aggregate data Z1 to generate HUB aggregate data Z2. HUB aggregate data Z2 includes an SM voltage aggregate value 301F generated by updating SM voltage aggregate value 301, an activation bit aggregate value 303F generated by updating activation bit aggregate value 303, an active SM number aggregate value 305F generated by updating active SM number aggregate value 305, and a failure bit aggregate value 307F generated by updating failure bit aggregate value 307.

SM voltage aggregate value 301F is the sum of SM voltage aggregate value 301 and respective SM voltages received by HUB#2. Activation bit aggregate value 303F is the logical conjunction of activation bit aggregate value 303 and respective activation bits received by HUB#2. Active SM number aggregate value 305F is the sum of active SM number aggregate value 305 and respective activation bits received by HUB#2. Failure bit aggregate value 307F is the logical disjunction of failure bit aggregate value 307 and respective failure bits received by HUB#2.

HUB data Y2a includes failure bit, separation bit, failure rank information and failure type information that are included in state information Dsm received by HUB#2, and also includes state information Dh of HUB#2. Because HUB data Y2a includes only a part of state information Dsm, the size of HUB data Y2a is smaller than the size of HUB data Y2 in FIG. 8.

Although not shown in FIG. 10, the aggregate value of state information Dh in HUB aggregate data Z1 is the operational bit of HUB#1. Further, the aggregate value of state information Dh in HUB aggregate data Z2 is the logical conjunction of the operational bit of HUB#1 and the operational bit of HUB#2.

Referring again to FIG. 9, HUB#3 performs an aggregation process on HUB aggregate data Z2 of communication frame 51A_a3 to update the data to HUB aggregate data Z3, adds HUB data Y3a, and updates the payload length and FCS region 84 to generate a communication frame 51A_a4. Likewise, HUB#4 performs an aggregation process on HUB aggregate data Z3 to update the data to HUB aggregate data Z4, adds HUB data Y4a to communication frame 51A_a4, and updates the payload length and FCS region 84 to generate a communication frame 51A_a5. HUB#4 transmits communication frame 51A_a5 to control device 101.

Advantages

According to Embodiment 2, data that is not required to be identified for each submodule 7 (e.g. SM voltage, activation bit, and the like) is subjected to an aggregation process and added as an aggregate value to the communication frame. Therefore, the data size of HUB data Y1a to Y4a in which individual data for submodules 7 is stored can be made smaller than the data size of HUB data Y1 to Y4 in FIG. 8, respectively. Specifically, the frame lengths of respective communication frames 51A_a2 to 51A_a5 can be made shorter than the frame lengths of respective communication frames 51A_2 to 51A_5 in FIG. 8, respectively.

Thus, the frame length can be shortened to shorten the time required per communication. Accordingly, the memory amount and the amount of operation that are necessary for control device 101 or protection device 102 can also be reduced. Moreover, a slow and low-cost communication module (e.g. communication module of 1 to 2 Gbps class) can be used to form a communication channel. Further, even when many submodules 7 are connected, the time for communication can shortened, which facilitates establishment of a large-scale HDVC system.

Embodiment 3

The above description regarding Embodiment 1 is given of the configuration where repeating device 32 is connected to each submodule 7 through a star network. In connection with Embodiment 3, a description is given of a configuration where repeating device 32 is connected to each submodule 7 through a ring network.

Figure 11:
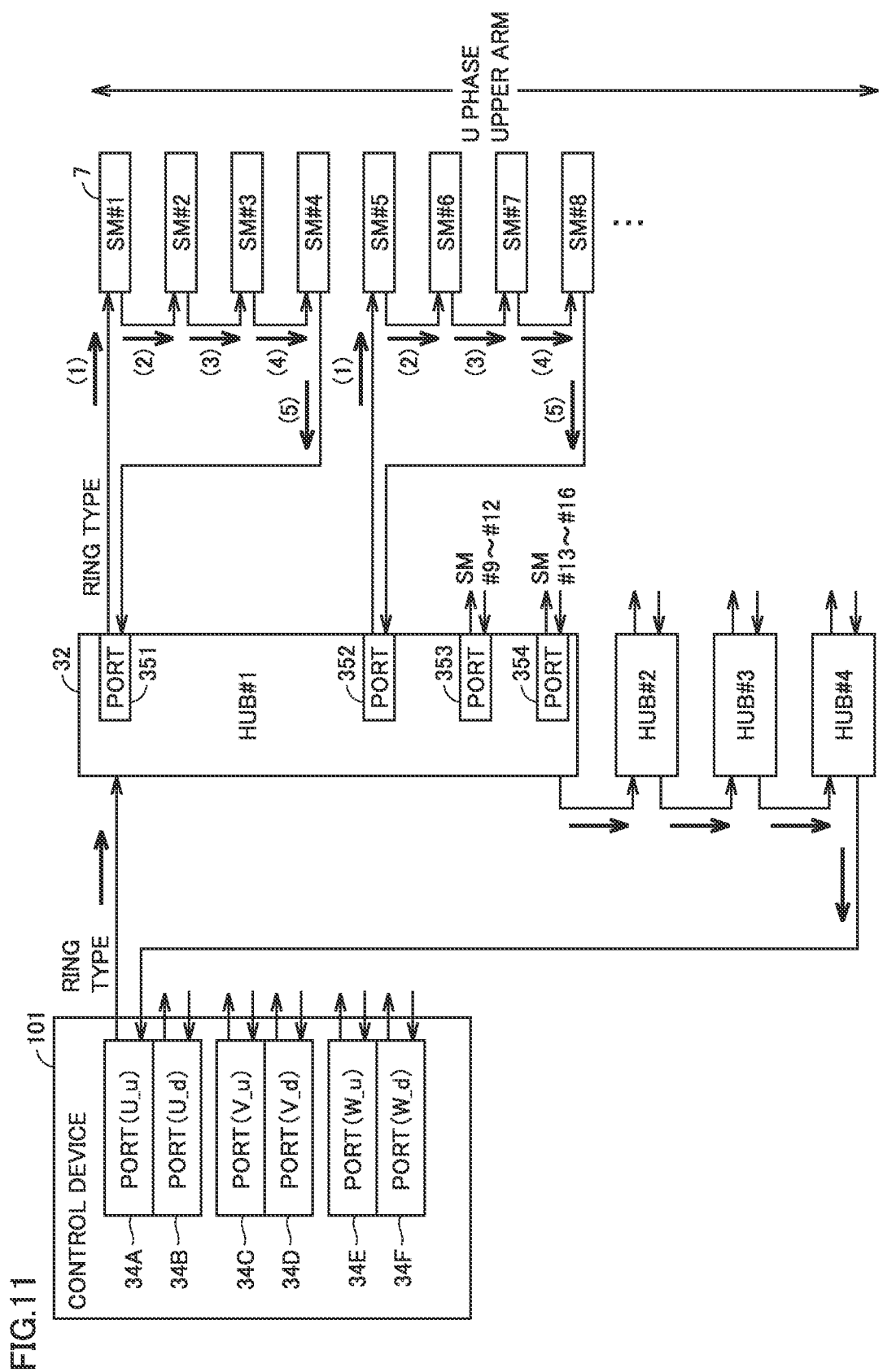
FIG. 11 shows a network configuration according to Embodiment 3.

FIG. 11 shows a network configuration according to Embodiment 3. The network configuration in FIG. 11 corresponds to a configuration formed by changing the connection topology between repeating device 32 and each submodule 7 in FIG. 6 to the ring topology. Referring to FIG. 11, each of communication ports 351 to 354 of each repeating device 32 is connected to a plurality of submodules 7 through the ring topology. For the sake of convenience, numbers #1 to #16 are allocated to respective submodules to distinguish the submodules from each other. Specifically, 16 submodules 7 are also referred to as submodules #1 to #16, respectively.

Communication port 351 of HUB#1 is connected to submodules #1 to #4 through the ring topology, communication port 352 is connected to submodules #5 to #8 through the ring topology, communication port 353 is connected to submodules #9 to #12 through the ring topology, and communication port 354 is connected to submodules #13 to #16 through the ring topology. For example, a communication frame that is output from communication port 351 is transmitted in the order of the numerals in the parentheses in FIG. 11, i.e., (1), (2), (3), (4), (5). The same applies as well to HUB#2 to HUB#4.

Figure 12:
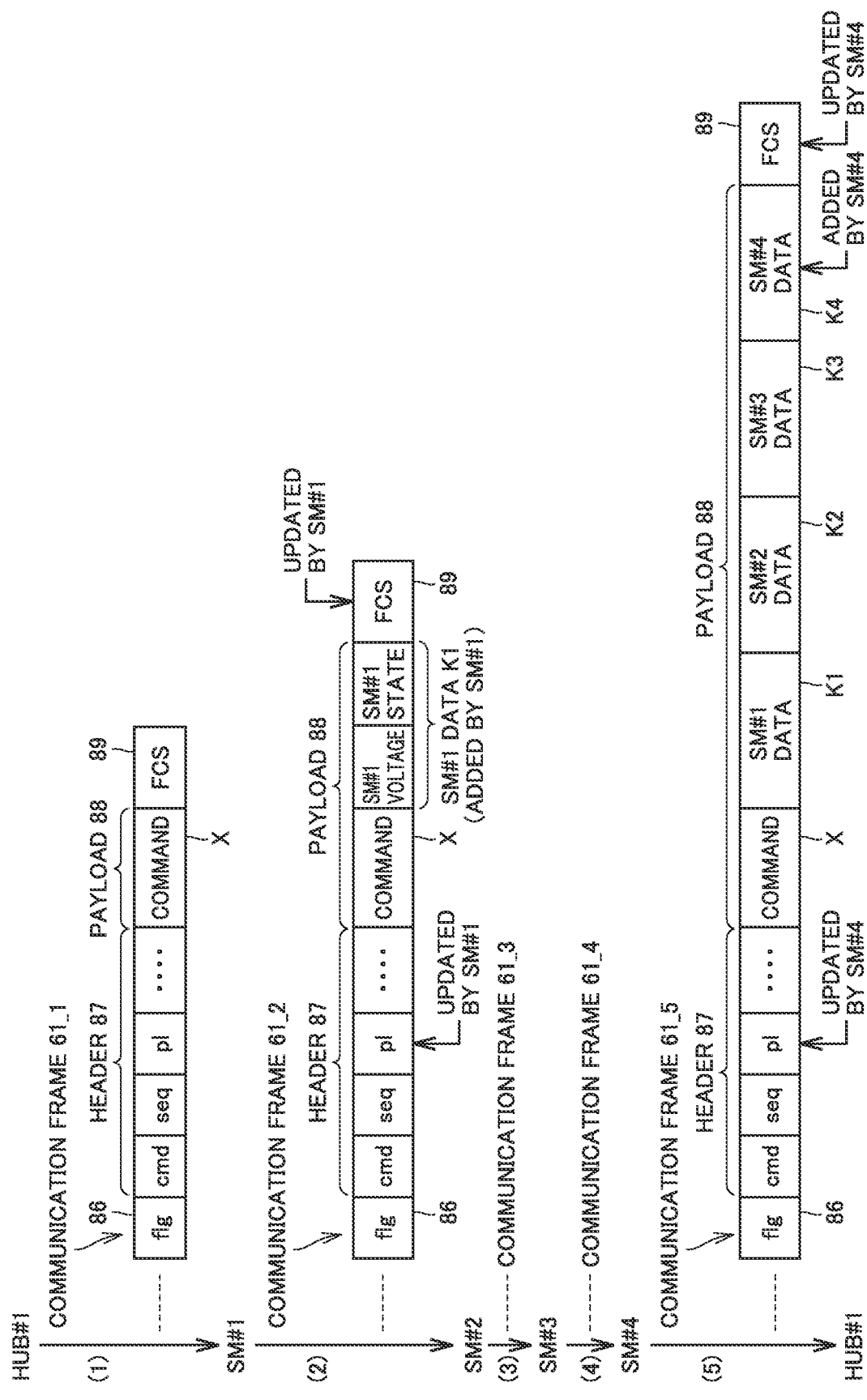
FIG. 12 illustrates an example of processing of a communication frame by submodules 7 according to Embodiment 3.

FIG. 12 illustrates an example of processing of a communication frame by submodules 7 according to Embodiment 3. Processing of a communication frame described in connection with FIG. 12 is basically similar to the processing of the communication frame described in connection with FIG. 8. Moreover, communication frames transmitted through respective communication ports of repeating device 32 are processed similarly. Therefore, example processing of a communication frame transmitted from communication port 351 is described herein. The numerals in the parentheses (1), (2), (3), (4), (5) in FIG. 12 correspond to the numerals in the parentheses in FIG. 11.

A communication frame 61_1 transmitted from HUB#1 to submodule #1 includes a flag region 86, a header region 87, a payload region 88, and an FCS region 89. Header region 87 includes information such as a communication command, a sequence number, and a payload length, for example. Payload region 88 includes command data X having the common command and arm command U_u.

Submodule #1 adds SM data K1 to the payload region of communication frame 61_1 received from HUB#1, and also updates the payload length and FCS region 89 to generate a communication frame 61_2. SM data K1 includes SM internal information of submodule #1. The SM internal information includes the capacitor voltage and state information Dsm of submodule #1.

Likewise, submodule #2 generates a communication frame 61_3, submodule #3 generates a communication frame 61_4, and submodule #4 generates a communication frame 61_5. In payload region 88 of communication frame 61_5, command data X and SM data K1 to K4 are stored. SM data K2 to K4 include the SM internal information of submodules #2 to #4, respectively.

Thus, to the communication frame transmitted from repeating device 32, the SM data field is coupled each time the communication frame is passed through submodule 7. Communication frames 61_1 to 61_5 therefore have respective formats different from each other.

Figure 13:
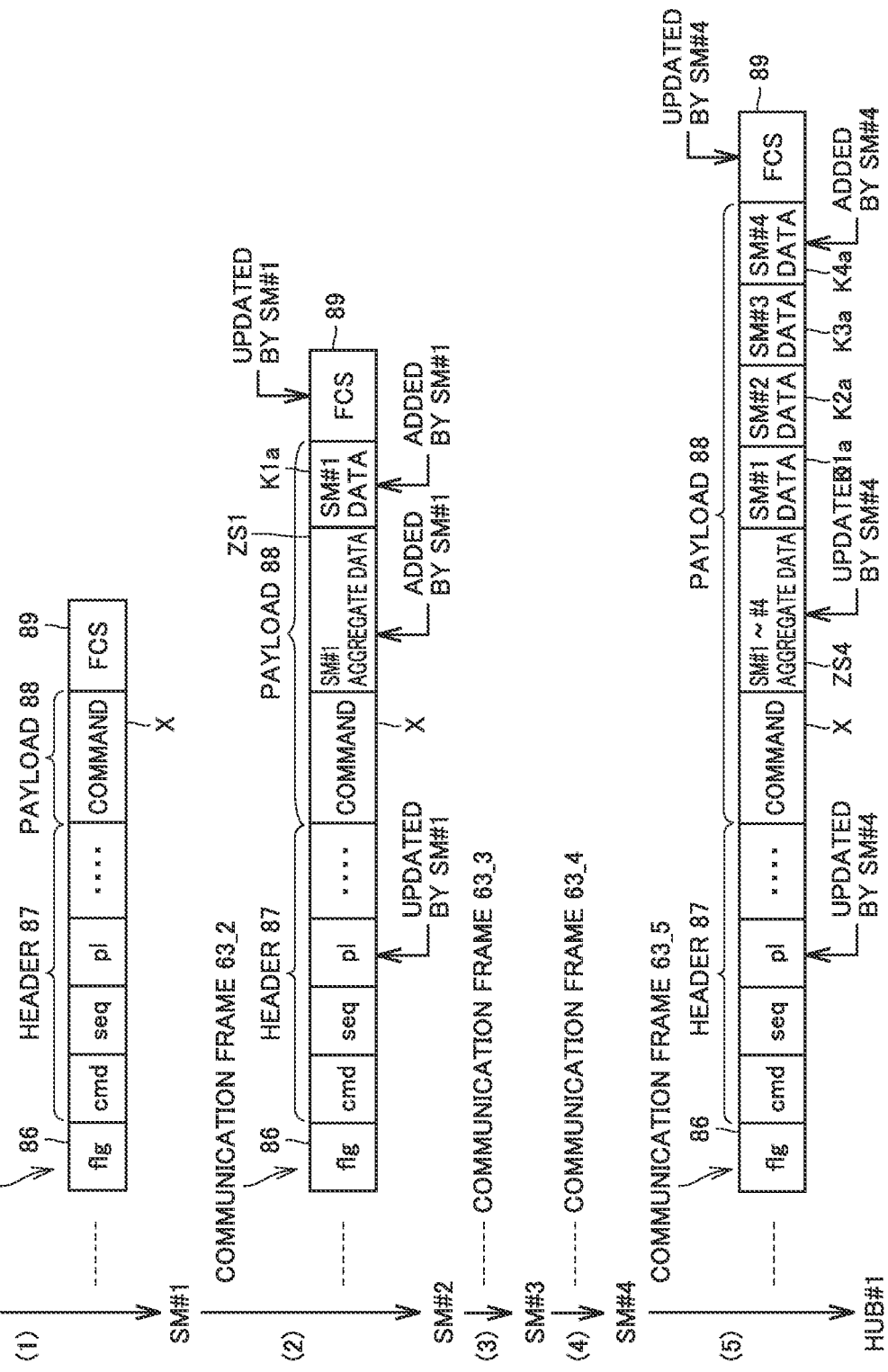
FIG. 13 illustrates another example of processing of a communication frame by submodules 7 according to Embodiment 3.

FIG. 13 illustrates another example of processing of a communication frame by submodules 7 according to Embodiment 3. Processing of a communication frame described in connection with FIG. 13 is basically similar to the processing of the communication frame described in connection with FIG. 9. Example processing of a communication frame transmitted from communication port 351 is described herein.

Referring to FIG. 13, a communication frame 63_1 transmitted from HUB#1 to submodule #1 is identical to communication frame 61_1 in FIG. 12. A communication frame 63_2 transmitted from submodule #1 to submodule #2 differs from communication frame 61_2 in FIG. 12 in terms of the contents of payload region 88.

Specifically, payload region 88 of communication frame 63_2 includes command data X, SM aggregate data Zs1, and SM data K1a. SM aggregate data Zs1 includes an aggregate value of the SM voltage of submodule #1, and an aggregate value of state information Dsm (e.g. an activation bit aggregate value, an active SM number aggregate value, a failure bit aggregate value) of submodule #1.

In SM aggregate data Zs1, only the information of submodule #1 is stored. Therefore, the aggregate value of the SM voltage of submodule #1 is the SM voltage of submodule #1. The activation bit aggregate value and the active SM number aggregate value are the activation bit of submodule #1. The failure bit aggregate value is the failure bit of submodule #1.

SM data K1a includes a failure bit, a separation bit, failure rank information and failure type information of submodule #1. Because SM data K1a includes only partial information of state information Dsm, the data size of SM data K1a is smaller than the data size of SM data K1 in FIG. 12.

Submodule #2 performs an aggregation process on SM aggregate data Zs1 to update SM aggregate data Zs1 to SM aggregate data Zs2, adds SM data K2a to communication frame 63_2, and updates the payload length and FCS region 89 to generate a communication frame 63_3.

Specifically, SM data K2a includes a failure bit, a separation bit, failure rank information and failure type information of submodule #2. SM aggregate data Zs2 includes an aggregate value of the SM voltages of submodules #1 to #2, and an aggregate value of state information Dsm (e.g. an activation bit aggregate value, an active SM number aggregate value, a failure bit aggregate value) of submodules #1 to #2.

The activation bit aggregate value of SM aggregate data Zs2 is the logical conjunction of the activation bit aggregate value of SM aggregate data Zs1 and the activation bit of submodule #2. The active SM number aggregate value of SM aggregate data Zs2 is the sum of the active SM number aggregate value of SM aggregate data Zs1 and the activation bit of submodule #2. The failure bit aggregate value of SM aggregate data Zs2 is the logical disjunction of the failure bit aggregate value of SM aggregate data Zs1 and the failure bit of submodule #2.

The same applies as well to processing performed by submodules #3, #4. Consequently, command data X, SM aggregate data Zs4, and SM data Ka1 to Ka4 are stored in the payload region of a communication frame 63_5.

Advantages

According to Embodiment 3, advantages similar to those of Embodiments 1 and 2 are obtained.

Embodiment 4

The above description regarding Embodiment 1 is given of the configuration where the communication controller is provided for each arm. In connection with Embodiment 4, a description is given of a configuration where a communication controller is provided for each phase of AC circuit 12.

Figure 14:
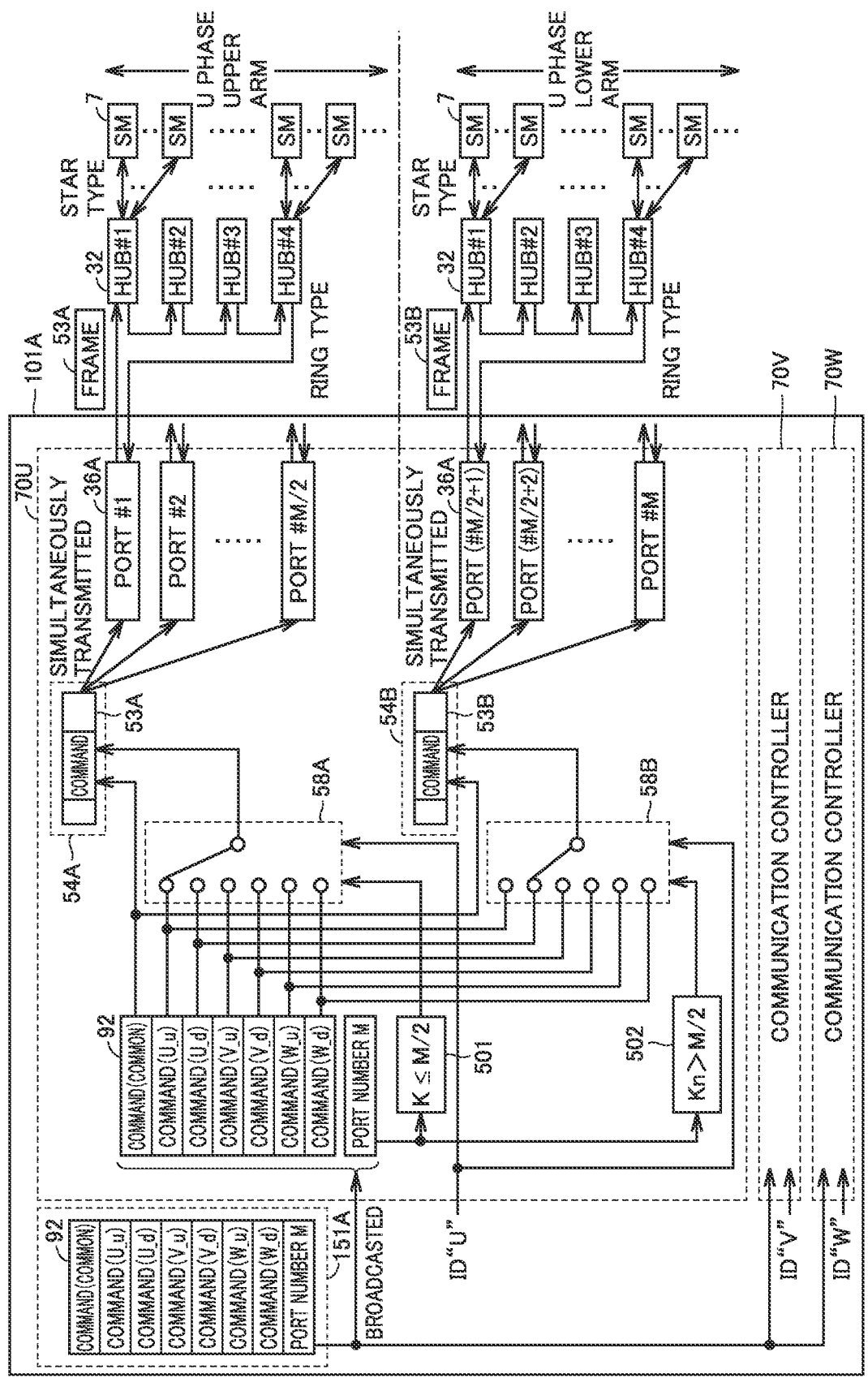
FIG. 14 illustrates a method for transmitting command information according to Embodiment 4.

FIG. 14 illustrates a method for transmitting command information according to Embodiment 4. Referring to FIG. 14, a control device 101A includes a command information generator 151A, and a plurality of communication controllers 70U, 70V, 70W (hereinafter also referred to collectively as "communication controller 70"). Communication controllers 70U, 70V, and 70W are communication controllers corresponding to U phase, V phase, and W phase, respectively. In other words, communication controllers 70U, 70V, and 70W are communication controllers provided for leg circuits 4u, 4v, and 4w, respectively.

Command information generator 151A generates command information 92 for each submodule 7. Because control device 101 is herein supposed to be a host device, command information 92 corresponds to the control command. Command information 92 includes a common command, an arm command for each arm, and a communication port number M. Communication port number M is the number of communication ports provided for each communication controller 153U, 153V, 153W.

Command information generator 151A broadcasts command information 92 to communication controllers 70 for respective phases. Communication controllers 70 for respective phases function similarly, and therefore, the functions of communication controller 70U are described herein.

Communication controller 70U receives command information 92 transmitted from command information generator 151A, and extracts, from command information 92, an arm command associated with communication controller 70U. Specifically, because communication controller 70U is a communication controller for leg circuit 4u of the U phase, communication controller 70U extracts an arm command U_u for upper arm 5 of leg circuit 4u, and an arm command U_d for lower arm 6 of leg circuit 4u.

Communication controller 70U transmits, to each repeating device connected to associated submodules 7 included in leg circuit 4u, a communication frame including the extracted arm command. Specifically, communication controller 70U transmits a communication frame 53A including arm command U_u to each repeating device 32 connected to associated submodules 7 included in upper arm 5 of leg circuit 4u. Communication controller 70 also transmits a communication frame 53B including arm command U_d to each repeating device 32 connected to associated submodules 7 included in lower arm 6 of leg circuit 4u.

Communication controller 70U includes selectors 58A, 58B, communication frame generators 54A, 54B, and a plurality of communication ports 36A. M communication ports 36A are provided (M is an integer satisfying M 2). For the sake of convenience, M communication ports 36A are distinguished from each other by respective numbers #1 to #M allocated to them.

Selector 58A selects arm command U_u, based on select ID "U" specified for selector 58A, and information 501 indicating that a half (e.g., communication ports with port numbers #1 to #M/2) of a plurality of communication ports 36A are to be used as communication ports for the upper arm, and outputs the selected arm command to communication frame generator 54A.

Communication frame generator 54A generates communication frame 53A including the common command and arm command U_u. Communication frame generator 54A transmits communication frame 53A to each repeating device 32 through communication ports 36A with respective port numbers #1 to #M/2. Specifically, communication frame generator 54A transmits communication frame 53A simultaneously to communication ports 36A#1 to 36A#M/2. Communication ports 36A#1 to 36A#M/2 transmit communication frame 53A to repeating devices 32.

Selector 58B selects arm command U_d, based on select ID "U" specified for selector 58B, and information 502 indicating that the remaining half (e.g., communication ports with port numbers #(M/2+1) to #M) of a plurality of communication ports 36A are to be used as communication ports for the lower arm, and outputs the selected arm command to communication frame generator 54B.

Communication frame generator 54B generates communication frame 53B including command data having the common command and arm command U_d. Communication frame generator 54B transmits communication frame 53B to each repeating device 32 through communication ports 36A with respective port numbers #(M/2+1) to #M.

Thus, when communication controller 70 is provided for each leg circuit 4, each of a plurality of communication controllers 70 transmits, to repeating device 32 connected to associated submodules 7 included in leg circuit 4 (e.g. leg circuit 4u) associated with this communication controller 70, the communication frames (e.g. communication frames 53A, 53B) including the extracted arm commands (e.g. arm commands U_u, U_d) for upper and lower arms respectively.

Regarding the example shown in FIG. 14, the above description is given of the configuration where command information 92 including communication port number M used for each phase is provided to communication controller 70. The configuration, however, is not limited to the above-described one. For example, communication port number M may be stored in advance as a fixed value in each communication controller 70. For example, when communication port number M in each communication controller 70 is fixed to 10 and used, communication controller 70 transmits a communication frame including the arm command for the upper arm, through communication ports 36A with port numbers #1 to #5, and transmits a communication frame including the arm command for the lower arm, through communication ports 36A with port numbers #6 to #10.

Advantages

According to Embodiment 4, advantages similar to those of Embodiment 1 are obtained.

Embodiment 5

According to Embodiment 1, repeating devices 32 connected through a single ring network are connected to submodules 7 in the same arm. In connection with Embodiment 5, a description is given of a configuration where some repeating devices 32 connected through a single ring network are connected to submodules 7 in the upper arm of a certain phase, and the other repeating devices 32 connected through the same ring network are connected to submodules 7 in the lower arm of the same phase.

Figure 15:
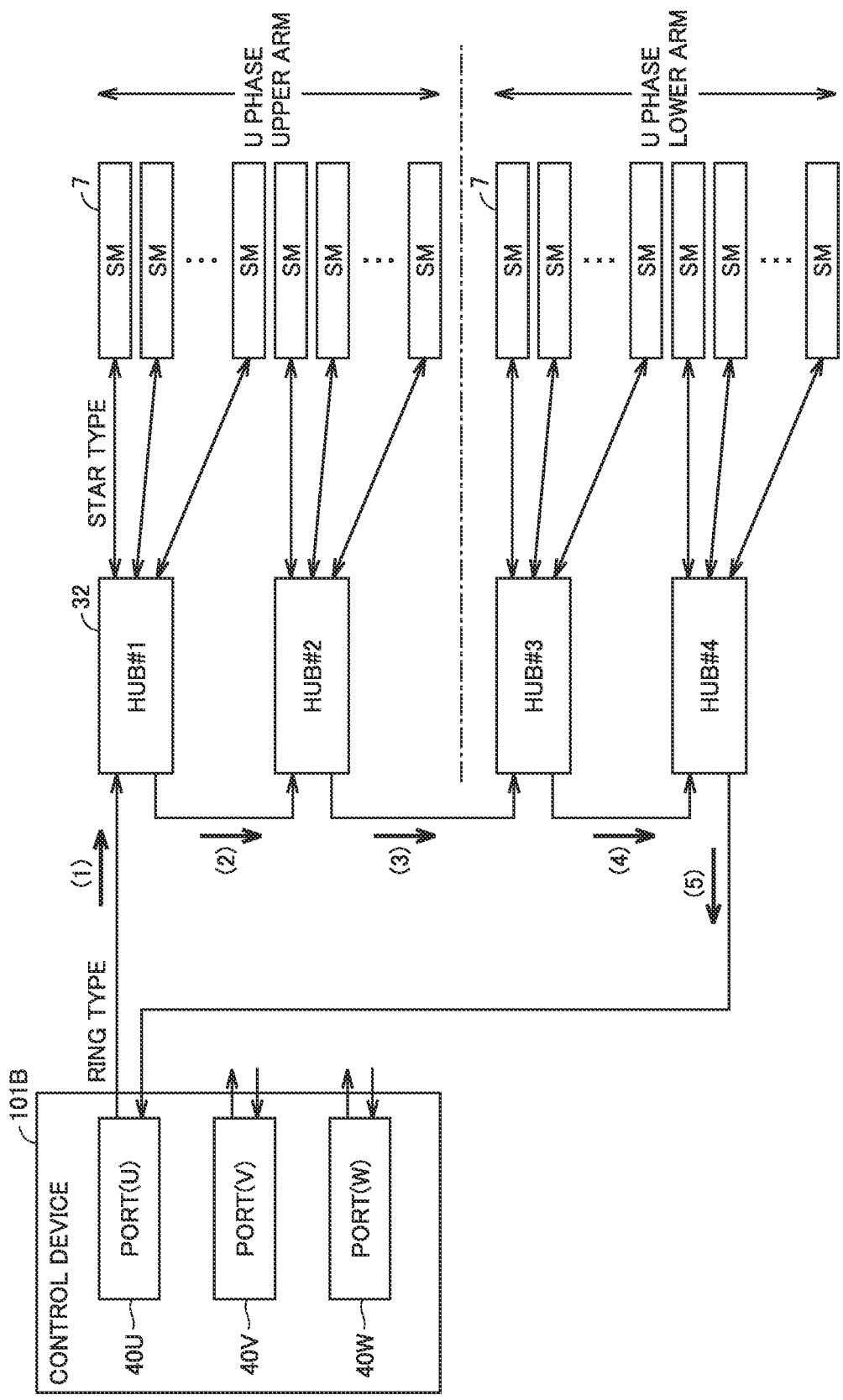
FIG. 15 shows a network configuration according to Embodiment 5.

FIG. 15 shows a network configuration according to Embodiment 5. Referring to FIG. 15, a control device 101B includes a communication port 40U for the U phase, a communication port 40V for the V phase, and a communication port 40W for the W phase. Communication port 40U is connected to HUB#1 to HUB#4 through the ring topology. Each of HUB#1 and HUB#2 is connected to associated submodules 7 for the U phase upper arm through the star topology. Each of HUB#3 and HUB#4 is connected to associated submodules 7 for the U phase lower arm through the star topology. The same applies as well to the V phase and the W phase.

A communication frame that is output from communication port 40U is transmitted in the order of the numerals in the parentheses (1), (2), (3), (4), (5) in FIG. 15. A method for transmitting the communication frame is described later herein. The method for transmitting a communication frame that is output from each communication port 40V, 40W is similar to the method for transmitting a communication frame that is output from communication port 40U.

Figure 16:
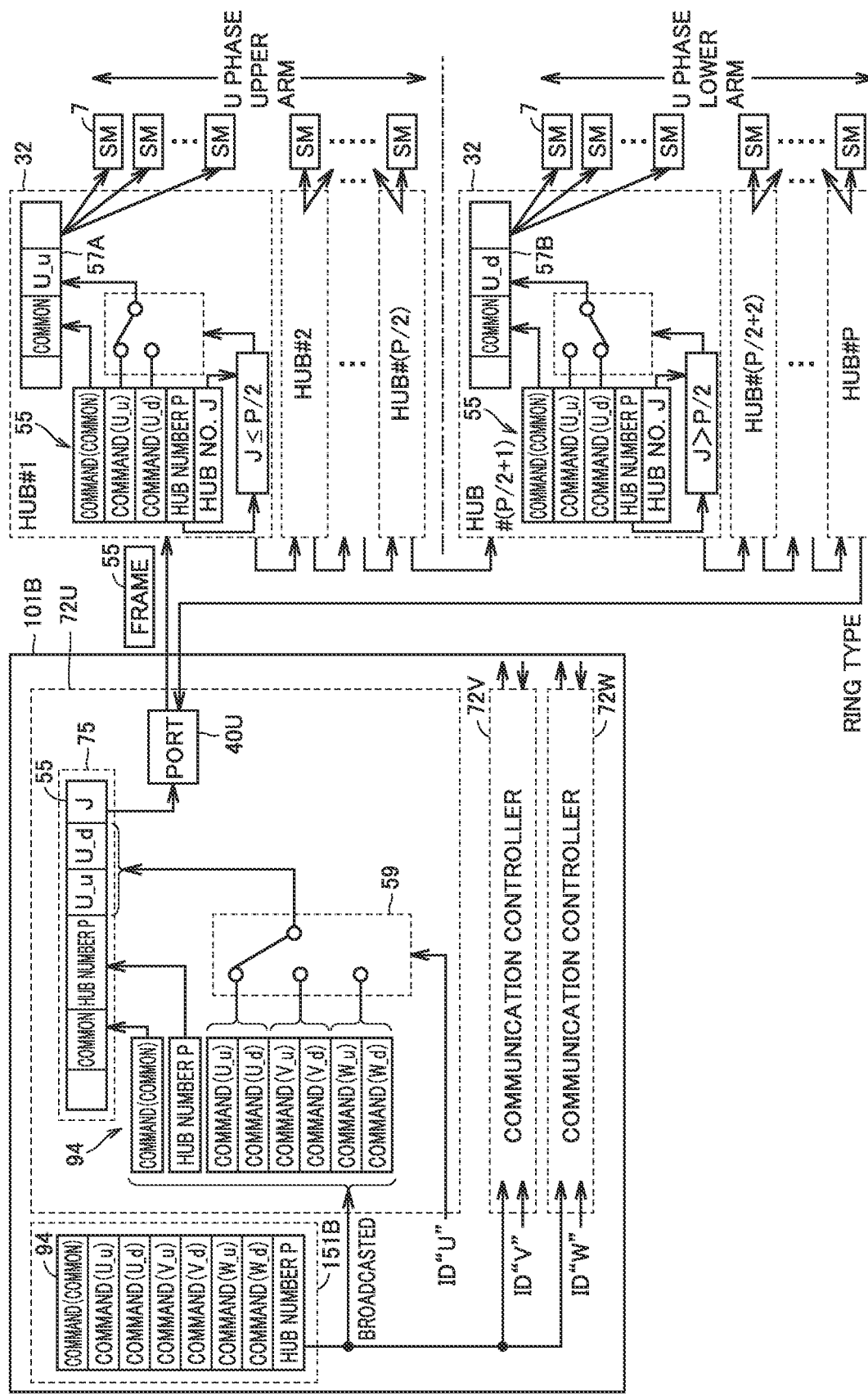
FIG. 16 illustrates a method for transmitting command information according to Embodiment 5.

FIG. 16 illustrates a method for transmitting command information according to Embodiment 5. Referring to FIG. 16, control device 101B includes a command information generator 151B, and a plurality of communication controllers 72U, 72V, 72W (hereinafter also referred to collectively as "communication controller 72"). Communication controllers 72U, 72V, and 72W are communication controllers corresponding to the U phase, the V phase, and the W phase, respectively.

Command information generator 151B generates command information 94 for each submodule 7. Because control device 101B is herein supposed to be a host device, command information 94 corresponds to the control command. Command information 94 includes a common command, arm commands for respective arms, and HUB number P. HUB number P is the number of repeating devices 32 allocated to each phase. Specifically, HUB number P is the number of repeating devices 32 connected to submodules 7 in each leg circuit 4.

Command information generator 151B broadcasts command information 94 to communication controllers 72 for respective phases. Communication controllers 72 for respective phases function similarly, and therefore, the functions of communication controller 72U are described herein.

Communication controller 72U receives command information 94 transmitted from command information generator 151B, and extracts, from command information 94, an arm command associated with communication controller 72U. Specifically, communication controller 72U extracts an arm command U_u for the upper arm of leg circuit 4u, and an arm command U_d for the lower arm of leg circuit 4u.

Communication controller 72U transmits, to each repeating device 32 connected to associated submodules 7 included in leg circuit 4u, a communication frame 55 including arm commands U_u, U_d. Specifically, communication controller 72U includes a selector 59, a communication frame generator 75, and communication port 40U.

Selector 59 selects arm commands U_u, U_d, based on select ID "U" that is specified for selector 59, and outputs the selected arm commends to communication frame generator 75. Communication frame generator 75 extracts, from command information 94, the common command, HUB number P, and arm commands U_u, U_d. Communication frame generator 75 generates communication frame 55 including the extracted common command, HUB number P, and arm commands U_u, U_d, as well as HUB No. J. The initial value of HUB No. J stored in communication frame 55 that is transmitted from communication port 40U is set to "0." Communication frame generator 75 transmits communication frame 55 to each repeating device 32 through communication port 40U.

HUB#1 receives communication frame 55. HUB#1 adds 1 (+1) to (namely increments) the value of HUB No. J stored in received communication frame 55 to generate the HUB No. of HUB#1 itself, and determines whether the generated HUB No. is less than or equal to the value P/2. Because the initial value of HUB No. J is "0," HUB#1 generates its HUB No. "1." Because HUB#1 satisfies J P/2, HUB#1 identifies itself as a repeating device 32 for the upper arm. HUB#1 therefore extracts, from communication frame 55, arm command U_u for the upper arm. HUB#1 also extracts the common command from communication frame 55.

HUB#1 generates a communication frame 57A including the common command and arm command U_u, and transmits this communication frame 57A to each submodule 7 connected to HUB#1. HUB#1 transmits, to HUB#2, a communication frame 55 generated by updating HUB No. J to its HUB No. (namely updating to HUB No. J=1).

Each of HUB#2 to HUB#P/2 compares, with the value P/2, its HUB No. J determined by incrementing the value of received HUB No. J, to identify itself as repeating device 32 for the upper arm. Each of HUB#2 to HUB#P/2 therefore performs a process similarly to HUB#1, and transmits communication frame 57A to each submodule 7 connected to itself.

Subsequently, HUB#(P/2+1) receives communication frame 55 from HUB#P/2. HUB#(P/2+1) adds 1 (+1) to the value of received HUB No. J to generate its HUB No. In this case, the generated HUB No. is J=(P/2+1). HUB#(P/2+1) determines whether generated HUB No. J is less than or equal to the value P/2. Because HUB#(P/2+1) satisfies J>P/2, HUB#(P/2+1) identifies itself as repeating device 32 for the lower arm. HUB#(P/2+1) therefore extracts, from communication frame 55, arm command U_d for the lower arm. HUB#(P/2+1) also extracts the common command from communication frame 55.

HUB#(P/2+1) generates a communication frame 57B including the common command and arm command U_d, and transmits this communication frame 57B to each submodule 7 connected to HUB#(P/2+1) itself. HUB#(P/2+1) transmits, to HUB#(P/2+2), communication frame 55 generated by updating HUB No. J to its HUB No. (namely updating to HUB No. J=(P/2+1)).

Each of HUB#(P/2+2) to HUB#P compares, with the value P/2, its HUB No. J generated by incrementing the value of received HUB number, to thereby identify itself as repeating device 32 for the lower arm. Each of HUB#(P/2+1) to HUB#P therefore performs a process similarly to HUB#(P/2+1), and transmits communication frame 57B to each submodule 7 connected to itself.

Advantages

According to Embodiment 5, advantages similar to those of Embodiment 1 are obtained.

OTHER EMBODIMENTS (1) Regarding the above example in FIG. 9 according to Embodiment 2, the above description is given of the configuration where each of HUB data Y1a to Y4a includes information about all submodules 7 connected to a respective one of HUB#1 to HUB#4. The configuration, however, is not limited to the above-described one. For example, if it is unnecessary to transmit information regarding all submodules 7 simultaneously to control device 101, the amount of data for submodules 7 transmitted per communication may be limited. Specifically, each of HUB data Y1a to Y4a may include only the information regarding specified submodule 7 to thereby shorten the communication frame length.

Figure 17:
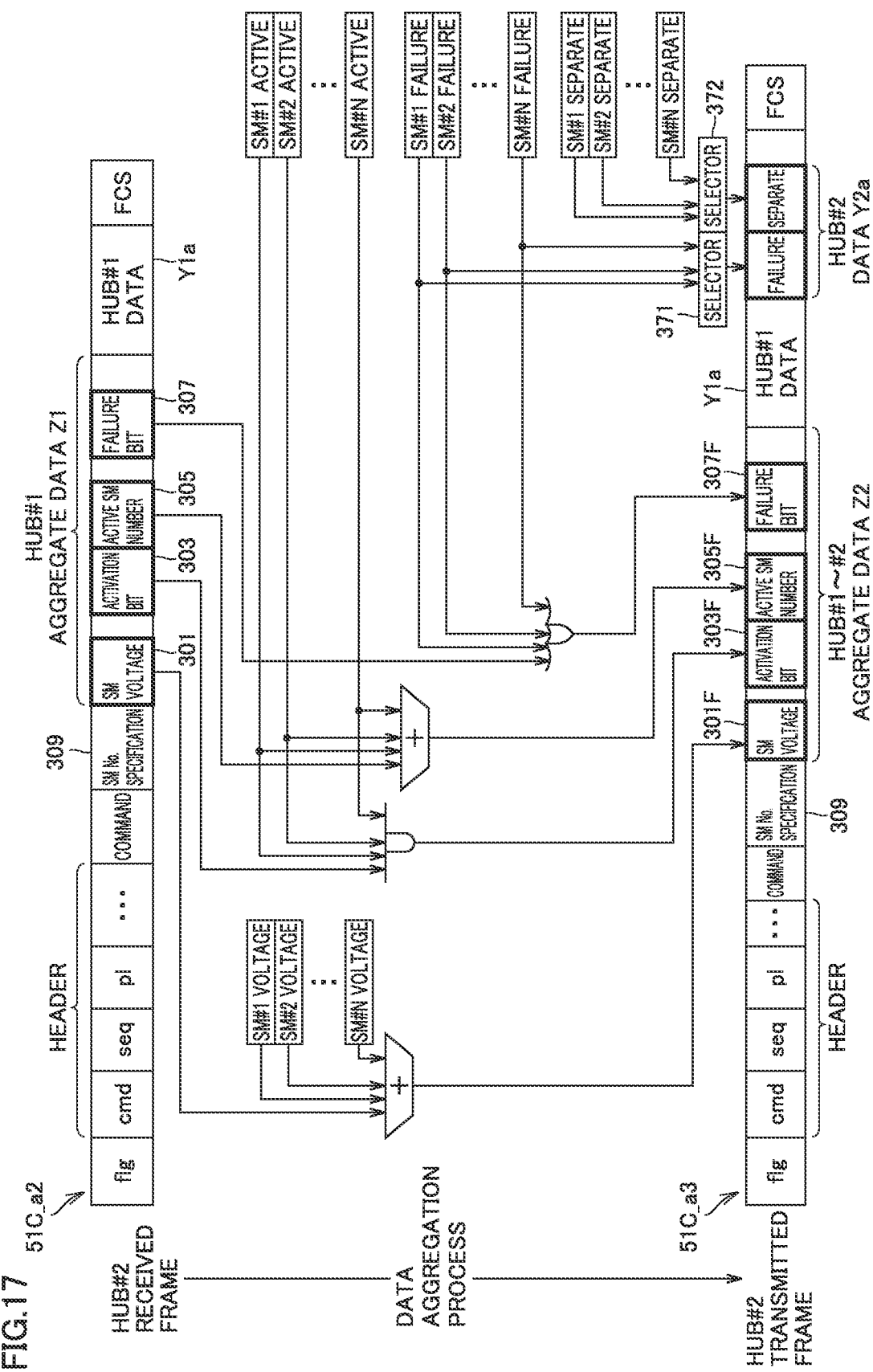
FIG. 17 illustrates a data aggregation process according to another embodiment.

FIG. 17 illustrates a data aggregation process according to another embodiment. A description is given herein of a data aggregation process performed by HUB#2. Referring to FIG. 17, a communication frame 51C_a2 received by HUB#2 includes the contents of communication frame 51A_a2 in the example in FIG. 9 to which an SM No. specification value 309 is added.

SM No. specification value 309 is information specifying the number of submodule 7 connected to HUB#1 to HUB#4 each. For example, when SM No. specification value 309 is "2," HUB#1 to HUB#4 each cause HUB data to include information regarding the second submodule 7 among submodules 7 connected to the HUB itself.

In the example in FIG. 17, HUB#2 selects, by a selector 371, a failure bit of the second submodule 7 among submodules 7, and stores the failure bit in HUB data Y2a. HUB#2 selects, by a selector 372, a separation bit of the second submodule 7 among submodules 7, and stores the separation bit in HUB data Y2a. Regarding the failure rank information and the failure type information as well, only the information regarding the second submodule 7 is stored in HUB data Y2a.

HUB data Y2a therefore includes failure bit, separation bit, failure rank information and failure type information that are included in state information Dsm of the second submodule 7, and also includes state information Dh of HUB#2. Thus, in the example in FIG. 17, HUB data Y2a does not include the information regarding submodules 7 other than the second submodule, and therefore, the data size is smaller than that of HUB data Y2a in FIG. 9 or 10. Regarding HUB data Y1a generated by HUB#1 as well, its data size is smaller than that of HUB data Y1a in FIG. 9 or 10. Regarding HUB aggregate data Z2, its data size is similar to the one in FIG. 9 or FIG. 10. HUB#2 transmits, to HUB#3, a communication frame 51C a3 including such HUB aggregate data Z2 and HUB data Y1a, Y2a.

Control device 101 transmits the communication frame in which SM No. specification value 309 is set to "2" to each of HUB#1 to HUB#4 and, when control device 101 next transmits the communication frame, it sets SM No. specification value 309 to "3" and transmits the communication frame including this SM No. specification value 309. Thus, each time control device 101 transmits the communication frame, it transmits the communication frame including a different SM No. specification value 309. For example, when R submodules are connected to each of HUB#1 to HUB#4, control device 101 can transmit the communication frame R times to thereby acquire information about all submodules 7 connected to each of HUB#1 to HUB#4. More than a single number may be set for SM No. specification value 309. For example, "1" and "2" may be set for SM No. specification value 309 in the present communication frame, and "3" and "4" may be set for SM No. specification value 309 in the next communication frame.

(2) Regarding the above embodiments, the above description is given of the configuration where repeating devices are provided between a host device and submodules, supposing that the system is a large-scale HDVC system including many submodules 7. If the embodiments are applied to a small-scale system like STATCOM or the like, the host device may be connected directly to submodules without using repeating devices.

(3) Regarding the above embodiments, the above description is given of the configuration where a plurality of repeating devices are connected to each communication port. The configuration, however, is not limited to the above-described one, and may be a configuration where a single repeating device is connected to each communication port. In this case, each communication port is connected to the repeating device by the star topology.

(4) Each configuration presented above as an embodiment by way of example is an example of the configuration of the present disclosure, and may be combined with another known technique, or modified by being omitted partially to the extent that does not go beyond the scope of the present disclosure. Moreover, the above-described embodiments may be implemented by appropriately employing a process(es) and/or a configuration(s) described in connection with other embodiments.

It should be construed that the embodiments disclosed herein are given by way of illustration in all respects, not by way of limitation. It is intended that the scope of the present disclosure is defined by claims, not by the description above, and encompasses all modifications and variations equivalent in meaning and scope to the claims.

REFERENCE SIGNS LIST 1 power conversion device; 2 power conversion circuitry; 3 command generation device; 4u, 4v, 4w leg circuit; 5 upper arm; 6 lower arm; 7 submodule; 8A, 8B reactor; 9A, 9B arm current detection device; 10 AC voltage detection device; 11A, 11B DC voltage detection device; 12 AC circuit; 13 interconnection transformer; 14 DC circuit; 15 operation command; 16 AC current detection device; 21 gate controller; 22A, 22B switching device; 23A, 23B diode; 24 capacitor; 25 conversion circuit; 26N, 26P input/output terminal; 27 voltage detector; 28 transmission and reception device; 31A, 31B, 58A, 58B, 59 selector; 32 repeating device; 34A-34F, 36A, 40U-40W, 351-354 communication port; 40 AC voltage command generator; 41 DC voltage command generator; 42 circulating current command generator; 44 arm voltage command generator; 52A, 52B, 54A, 54B, 75 communication frame generator; 70U-70W, 72U-72W, 153, 153A, 153B, 153U-153W communication controller; 81, 86 flag region; 82, 87 header region; 83, 88 payload region; 84, 89 FCS region; 101, 101A, 101B control device; 102 protection device; 151A, 151B command information generator; 320 repeating device group.

The invention claimed is:

1. A power conversion device to perform power conversion between a DC circuit and an AC circuit, the power conversion device comprising:
power conversion circuitry including a leg circuit for each phase of the AC circuit,
each leg circuit including a first arm and a second arm, the first arm and the second arm each including a plurality of submodules connected in series to each other;
a host device to control each submodule of the plurality of submodules; and
a plurality of repeating devices to relay communication between the host device and each submodule of the plurality of submodules,
the host device including:
a command information generator to generate command information including an arm command for each arm; and
a communication controller provided for each leg circuit or each arm included in the power conversion circuitry,
each communication controller of a plurality of the communication controllers
receives the command information transmitted from the command information generator,
extracts, from the command information, an arm command associated with the communication controller, and
transmits a communication frame including the extracted arm command to at least one of the plurality of repeating devices that is connected to each submodule included in a leg circuit or an arm associated with the communication controller.

2. The power conversion device according to claim 1, wherein
the command information further includes a common command that is common to arms included in the power conversion circuitry,
each communication controller of the plurality of the communication controllers further extracts the common command from the command information, and
the communication frame further includes the common command.

3. The power conversion device according to claim 1, wherein
each communication controller of the plurality of the communication controllers is connected to two or more repeating devices of the plurality of repeating devices through a ring network,
a first repeating device of the two or more repeating devices
generates first repeating information based on internal information received from each first submodule of a plurality of first submodules that communicate with the first repeating device,
adds the first repeating information to a communication frame received from the communication controller connected to the first repeating device, and
transmits, to a repeating device connected to the first repeating device, the communication frame to which the first repeating information is added.

4. The power conversion device according to claim 3, wherein the first repeating information includes aggregate information generated by aggregating respective pieces of first information included in respective pieces of the internal information, and second information included in the internal information.

5. The power conversion device according to claim 4, wherein
the first information includes a voltage value of a capacitor included in the first submodule, and
the second information includes failure information indicating a failure state of the first submodule.

6. The power conversion device according to claim 3, wherein each communication controller of the plurality of the communication controllers is connected to the two or more repeating devices through a plurality of the ring networks.

7. The power conversion device according to claim 3, wherein
a second repeating device of the two or more repeating devices
generates second repeating information based on internal information received from each second submodule of a plurality of second submodules that communicate with the second repeating device,
adds the second repeating information to a communication frame received from a repeating device connected to the second repeating device, and
transmits the communication frame to which the second repeating information is added, to the communication controller connected to the second repeating device.

8. The power conversion device according to claim 3, wherein the first repeating device is connected to the plurality of first submodules through a star network.

9. The power conversion device according to claim 3, wherein the first repeating device is connected to the plurality of first submodules through a ring network.

10. The power conversion device according to claim 1, wherein
- the communication controller is provided for each leg circuit,
- each communication controller of the plurality of the communication controllers
  - transmits, to at least one repeating device of the plurality of repeating devices that is connected to each submodule included in the first arm of the leg circuit associated with the communication controller, a communication frame including an arm command for the first arm, and
  - transmits, to at least one repeating device of the plurality of repeating devices that is connected to each submodule included in the second arm of the leg circuit associated with the communication controller, a communication frame including an arm command for the second arm.

11. The power conversion device according to claim 1, wherein
- the communication controller is provided for each arm, and
- each communication controller of the plurality of the communication controllers transmits, to at least one repeating device of the plurality of repeating devices that is connected to each submodule included in an arm associated with the communication controller, a communication frame including an arm command for the arm.

12. The power conversion device according to claim 1, wherein
- when the host device is a control device to control operation of each submodule of the plurality of submodules, the arm command includes an arm voltage command value, and
- when the host device is a protection device to protect each submodule of the plurality of submodules, the arm command includes a stop command to stop operation of the submodule.

13. The power conversion device according to claim 2, wherein
- each communication controller of the plurality of the communication controllers is connected to two or more repeating devices of the plurality of repeating devices through a ring network,
- a first repeating device of the two or more repeating devices
  - generates first repeating information based on internal information received from each first submodule of a plurality of first submodules that communicate with the first repeating device,
  - adds the first repeating information to a communication frame received from the communication controller connected to the first repeating device, and
  - transmits, to a repeating device connected to the first repeating device, the communication frame to which the first repeating information is added.

14. The power conversion device according to claim 4, wherein each communication controller of the plurality of the communication controllers is connected to the two or more repeating devices through a plurality of the ring networks.

15. The power conversion device according to claim 5, wherein each communication controller of the plurality of the communication controllers is connected to the two or more repeating devices through a plurality of the ring networks.

16. The power conversion device according to claim 4, wherein
- a second repeating device of the two or more repeating devices
  - generates second repeating information based on internal information received from each second submodule of a plurality of second submodules that communicate with the second repeating device,
  - adds the second repeating information to a communication frame received from a repeating device connected to the second repeating device, and
  - transmits the communication frame to which the second repeating information is added, to the communication controller connected to the second repeating device.

17. The power conversion device according to claim 5, wherein
- a second repeating device of the two or more repeating devices
  - generates second repeating information based on internal information received from each second submodule of a plurality of second submodules that communicate with the second repeating device,
  - adds the second repeating information to a communication frame received from a repeating device connected to the second repeating device, and
  - transmits the communication frame to which the second repeating information is added, to the communication controller connected to the second repeating device.

18. The power conversion device according to claim 6, wherein
- a second repeating device of the two or more repeating devices
  - generates second repeating information based on internal information received from each second submodule of a plurality of second submodules that communicate with the second repeating device,
  - adds the second repeating information to a communication frame received from a repeating device connected to the second repeating device, and
  - transmits the communication frame to which the second repeating information is added, to the communication controller connected to the second repeating device.

19. The power conversion device according to claim 4, wherein the first repeating device is connected to the plurality of first submodules through a star network.

20. The power conversion device according to claim 5, wherein the first repeating device is connected to the plurality of first submodules through a star network.

* * * * *